(12) United States Patent
Jakubowski et al.

(10) Patent No.: US 11,006,609 B2
(45) Date of Patent: May 18, 2021

(54) PET PRIVY SYSTEM

(71) Applicant: Vermont Juvenile Furniture Mfg., Inc., West Rutland, VT (US)

(72) Inventors: Kristen Jakubowski, Rutland, VT (US); Chris Jakubowski, Rutland, VT (US); Todd Jakubowski, Rutland, VT (US)

(73) Assignee: Vermont Juvenile Furniture Mfg., Inc., West Rutland, VT (US)

( * ) Notice: Subject to any disclaimer, the term of this patent is extended or adjusted under 35 U.S.C. 154(b) by 131 days.

(21) Appl. No.: 16/217,568

(22) Filed: Dec. 12, 2018

(65) Prior Publication Data

US 2019/0174710 A1    Jun. 13, 2019

Related U.S. Application Data

(60) Provisional application No. 62/597,486, filed on Dec. 12, 2017.

(51) Int. Cl.
*A01K 1/01* (2006.01)
*A01K 1/03* (2006.01)

(52) U.S. Cl.
CPC .................. *A01K 1/0107* (2013.01)

(58) Field of Classification Search
CPC ...... A01K 1/0125; A01K 1/0107; A01K 1/03; A01K 1/033; E04H 15/34; E04H 15/44
USPC ........ 135/121, 128, 143, 130, 144, 153, 157
See application file for complete search history.

(56) References Cited

U.S. PATENT DOCUMENTS

| | | | | | |
|---|---|---|---|---|---|
| 2,810,390 | A | * | 10/1957 | Wallace | E04H 15/44 135/160 |
| 2,865,386 | A | * | 12/1958 | Burns | E04H 15/64 135/157 |
| 3,323,530 | A | * | 6/1967 | Smith | A01M 31/025 135/157 |
| 4,271,544 | A | * | 6/1981 | Hammond | A01K 1/0121 119/162 |
| 4,286,612 | A | * | 9/1981 | Neal | A01K 1/033 135/115 |
| 4,779,294 | A | * | 10/1988 | Miller | A47C 31/002 135/121 |
| 5,078,096 | A | * | 1/1992 | Bishop | A01K 1/0254 119/497 |

(Continued)

*Primary Examiner* — Magdalena Topolski
*Assistant Examiner* — Katelyn T Truong
(74) *Attorney, Agent, or Firm* — Volpe Koenig

(57) ABSTRACT

A pet privy system is provided that is compact for shipping, and can be easily and quickly assembled by an owner. The system includes a cloth enclosure that has sidewalls and a top. A frame assembly supports the cloth enclosure, and includes a top frame, first and second side frames connected to the top frame, and cross-members that are connected between opposite sides of the first and second side frames from the top frame. A removable pan having a length and a width is provided, with the length being less than a distance between the first and second side frames. The pan is slideable between the first and second side frames. An inner guard wall is also provided having two sides and a back that are connected together and located inside the frame assembly and are adapted to be located between the sidewalls of the cloth enclosure and the removable pan.

17 Claims, 26 Drawing Sheets

(56) References Cited

U.S. PATENT DOCUMENTS

| | | | |
|---|---|---|---|
| 5,094,188 A * | 3/1992 | Wolak | A01K 1/0125 119/168 |
| 5,678,509 A | 10/1997 | Dillon | |
| 5,931,120 A | 8/1999 | Burns et al. | |
| 6,076,485 A | 6/2000 | Peeples et al. | |
| 6,155,206 A | 12/2000 | Godshaw | |
| 6,311,709 B1 | 11/2001 | Louie et al. | |
| 6,332,429 B1 * | 12/2001 | Gramlich | A01K 1/0107 119/165 |
| 6,978,736 B2 | 12/2005 | Sanford et al. | |
| 7,044,083 B2 | 5/2006 | Farmer et al. | |
| 7,380,521 B2 | 6/2008 | Morton et al. | |
| 7,665,421 B2 | 2/2010 | Martz | |
| D611,202 S | 3/2010 | Jakubowski et al. | |
| 7,703,416 B2 | 4/2010 | Farmer et al. | |
| 7,753,003 B2 | 7/2010 | Farmer et al. | |
| D622,009 S | 8/2010 | Jakubowski et al. | |
| 7,789,044 B2 | 9/2010 | McGrade | |
| 7,802,540 B2 | 9/2010 | Jakubowski et al. | |
| 8,117,993 B2 | 2/2012 | Farmer et al. | |
| 8,127,719 B2 | 3/2012 | Jakubowski et al. | |
| 8,622,023 B1 * | 1/2014 | Tierney | A01K 1/0107 119/165 |
| 8,746,179 B2 | 6/2014 | Farmer et al. | |
| 8,757,095 B2 | 6/2014 | Farmer et al. | |
| 8,985,058 B2 | 3/2015 | Cantwell et al. | |
| 9,521,826 B2 | 12/2016 | Rybka et al. | |
| 2004/0244716 A1 * | 12/2004 | Simpson | A01K 1/0125 119/499 |
| 2005/0103279 A1 * | 5/2005 | Brewer | A01K 1/033 119/498 |
| 2006/0213452 A1 | 9/2006 | King | |
| 2007/0251463 A1 * | 11/2007 | Lu | A01K 1/03 119/452 |
| 2009/0205578 A1 | 8/2009 | Alves | |
| 2010/0043720 A1 | 2/2010 | Yelverton | |
| 2010/0139573 A1 | 6/2010 | Wilson et al. | |
| 2012/0210947 A1 | 8/2012 | DiPaolo | |
| 2012/0304937 A1 | 12/2012 | Matteson et al. | |
| 2015/0305296 A1 | 10/2015 | Lu | |
| 2016/0014992 A1 * | 1/2016 | Link | A01K 1/015 119/416 |
| 2019/0289814 A1 * | 9/2019 | Zhuo | A01K 1/033 |

* cited by examiner

PET PRIVY SYSTEM

INCORPORATION BY REFERENCE

The following documents are incorporated herein by reference as if fully set forth: U.S. Provisional Application No. 62/597,486, filed Dec. 12, 2017.

BACKGROUND

Crates, cages and other similar apparatus for housing and transporting pets are well-known in the art. These cages and crates can be rigid, or may be formed as a "soft" pet enclosure. In each case, the crate or cage is designed to contain a pet and includes sidewalls, a top, and a bottom, with one or more openable and closable doors located in the sidewalls or top.

Litter boxes for cats as well as training pads (puppy pads) and grass patches for dogs are also known which are, in effect, indoor bathrooms for pets. These are placed in a convenient place for pet use, which is preferably out of the way and also out of sight in the home. However, these indoor pet facilities are unsightly, can smell, and depending on the size of a pet owner's dwelling, are in plain sight.

What has also not been previously considered is that some pets also are less stressed if they can relieve themselves in private.

SUMMARY

In one aspect, the present invention provides a pet privy that can be used in connection with a litter box, puppy pad, or grass patch, or other indoor pet bathroom media, that provides an enclosed pet bathroom area that is easy for a pet to access, easy for an owner to clean, and also keeps any messes contained.

A pet privy system is provided that is compact for shipping, and can be easily and quickly assembled by an owner. The system includes a cloth enclosure that includes sidewalls and a top. A frame assembly supports the cloth enclosure, and includes a top frame, first and second side frames connected to the top frame, and cross-members that are connected between opposite sides of the first and second side frames on an opposite side from the top frame. A removable protective bottom part, preferably in the form of a pan, is provided and has a length and a width, with the length being less than a distance between the first and second side frames. The pan is slideable between the first and second side frames. An inner guard wall is preferably also provided having two sides and a back that are connected together and located inside the frame assembly and are adapted to be located between the sidewalls of the cloth enclosure and the removable pan.

In one embodiment, the cloth enclosure includes an opening in one of the sidewalls. Preferably one of the sidewalls of the cloth enclosure also defines a pan opening at a bottom of the frame assembly.

In one embodiment, the top frame comprises four edge members that are connected together, with the first and second side frames being pivotally connected to opposite ones of the edge members. Two cross-members are also provided and are pivotally attached to one of the first and second side frames and are engagable to the other of the first and second side frames. Optionally, the frame assembly may include two center members that extend between opposite ones of the edge members to support the top of the cloth enclosure.

In one embodiment, the first and second side frames are U-shaped.

In a preferred arrangement, the cross-members are engagable to the other of the first and second side frames via bent ends of the cross-members engaging in receptacles fastened to the other of the first and second side frames.

In an alternate embodiment, the top frame and the first and second side frames are provided, with the first and second side frames being pivotally connected to opposite ones of the edge members of the top frame. Two split cross-members are also provided and are pivotally attached to the bottoms of the first and second side frames and are engagable, and are engagable in a medial region to form the two cross members. Preferably the free ends of the respective split cross-members are engagable via a barrel connector located on one free end of a split cross-member in which a free end of the opposite part of the split cross-member is engaged.

Preferably, the frame assembly with the attached cloth enclosure is unfoldable from a collapsed position in which the cross-members and the first and second side frames are lying on and generally in a plane that is parallel to the top frame, to an assembled position in which the first and second side frames are generally perpendicular to the top frame, and the cross-members are connected between the first and second side frames to define a plane generally parallel to and spaced apart by the side frames from the top frame.

Preferably, the width of the removable pan is less than a width of the first and second side frames.

In one embodiment, the two sides and the back include integral connectors such that the sides are connectable to opposite edges of the back without tools to construct the inner guard wall. The integral connectors preferably include hook-shaped projections extending from the opposite edges of the back and complementary slots defined along at least back edges of the sides that are adapted to receive the hook-shaped projections.

In one embodiment, the sides of the inner guard wall are Z-shaped in cross-section, with bottom legs of the sidewalls being spaced further apart from one another than top legs of the side walls, and a distance between the bottom legs is greater than the length of the removable pan.

Preferably, the removable pan has a lip with a defined height and a height of the bottom legs of the sides is greater than the defined height.

The cloth enclosure preferably includes straps for connection to the frame assembly. The straps are releasable so that the cloth enclosure can be removed for washing, if needed. The straps preferably include hook-and-loop textile fastening material.

Further aspects of the invention are described below and in the claims.

BRIEF DESCRIPTION OF THE DRAWINGS

The foregoing summary, as well as the following detailed description of the preferred embodiments of the invention will be better understood when read in conjunction with the appended drawings. For the purpose of illustrating the invention, there is shown in the drawings embodiments which are presently preferred. It should be understood, however, that the invention is not limited to the precise arrangement shown.

DETAILED DESCRIPTION OF THE PREFERRED EMBODIMENTS

Figure 1:
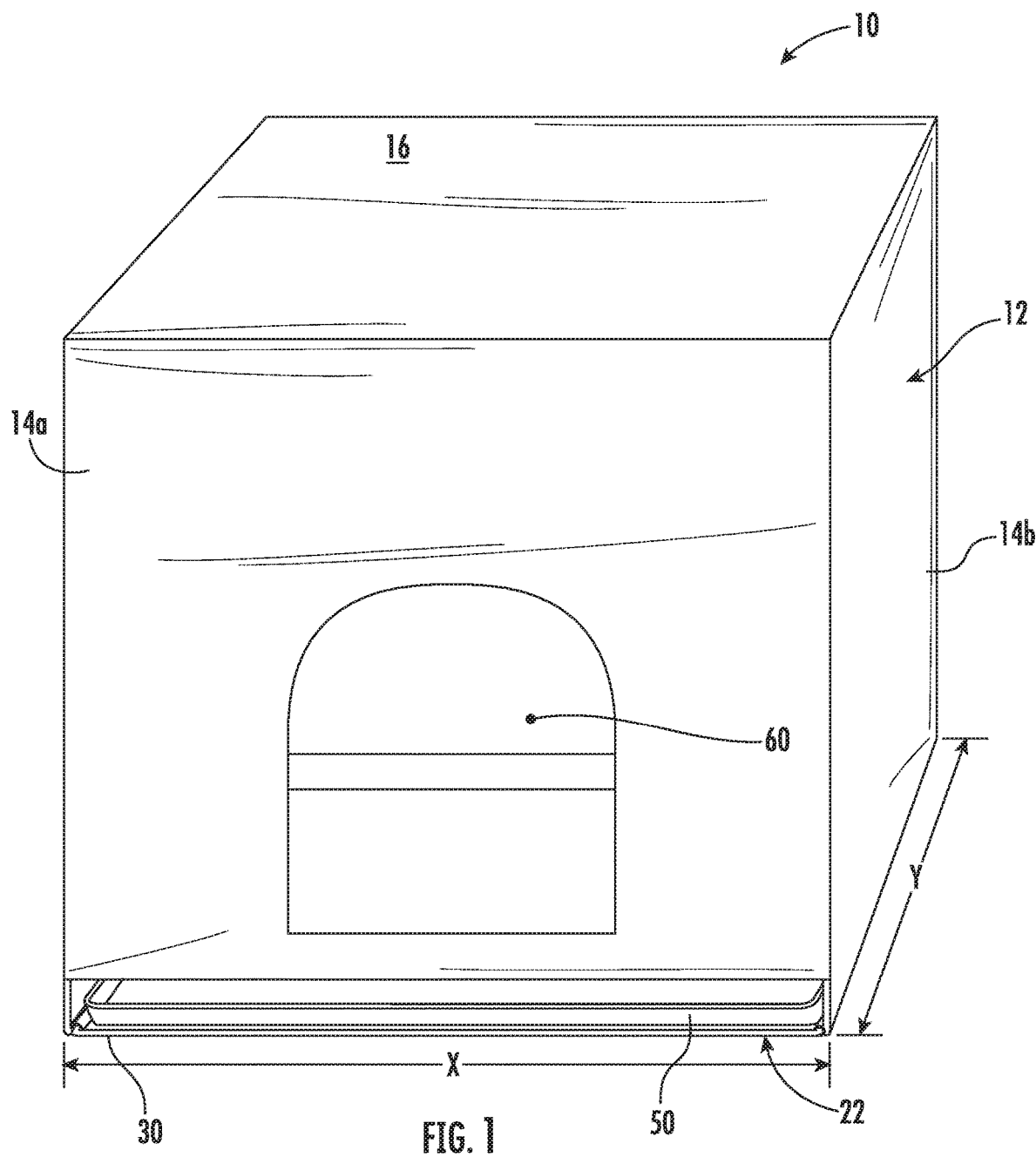
FIG. 1 is a top, front, right perspective view of a first embodiment of a Pet Privy System.

For purposes of this detailed description, words such as "front", "back", "top", "bottom", "left", and "right" designate directions in the drawings, and are used for convenience in referring to the designated parts or areas. The use of the terminology "at least one of" followed by a list of elements, such as "A, B, or C", means A, B, or C individually or various combinations thereof.

Referring to FIG. 1, a Pet Privy System 10 is shown. The Pet Privy System 10 includes a cloth enclosure 12, shown in detail in FIGS. 17-23, a frame assembly 30, shown in detail in FIGS. 2-9, a removable protective bottom part, preferably in the form of a pan 50, shown in detail in FIG. 16, as well as an optional inner guard 60, shown in detail in FIGS. 10-15.

Referring to FIGS. 1 and 17-23, the cloth enclosure 12 includes sidewalls 14a, 14b, 14c, 14d, as well as a top 16. The cloth enclosure 12 includes an opening 20 in one of the sidewalls 14a, although multiple openings could be provided, if desired. One of the sidewalls 14a of the cloth enclosure 12 defines a pan opening 22 along a bottom of the frame assembly 30. This is used to provide access for installing and removing the removable pan 50, shown in detail in FIGS. 1 and 2. Preferably, the cloth enclosure 12 includes straps 18, best shown in FIGS. 19 and 20, which are used to connect the cloth enclosure 12 to the frame assembly 30. These straps 18 preferably include hook-end-loop textile fastening material, such as VELCRO® textile fasteners.

Figure 17:
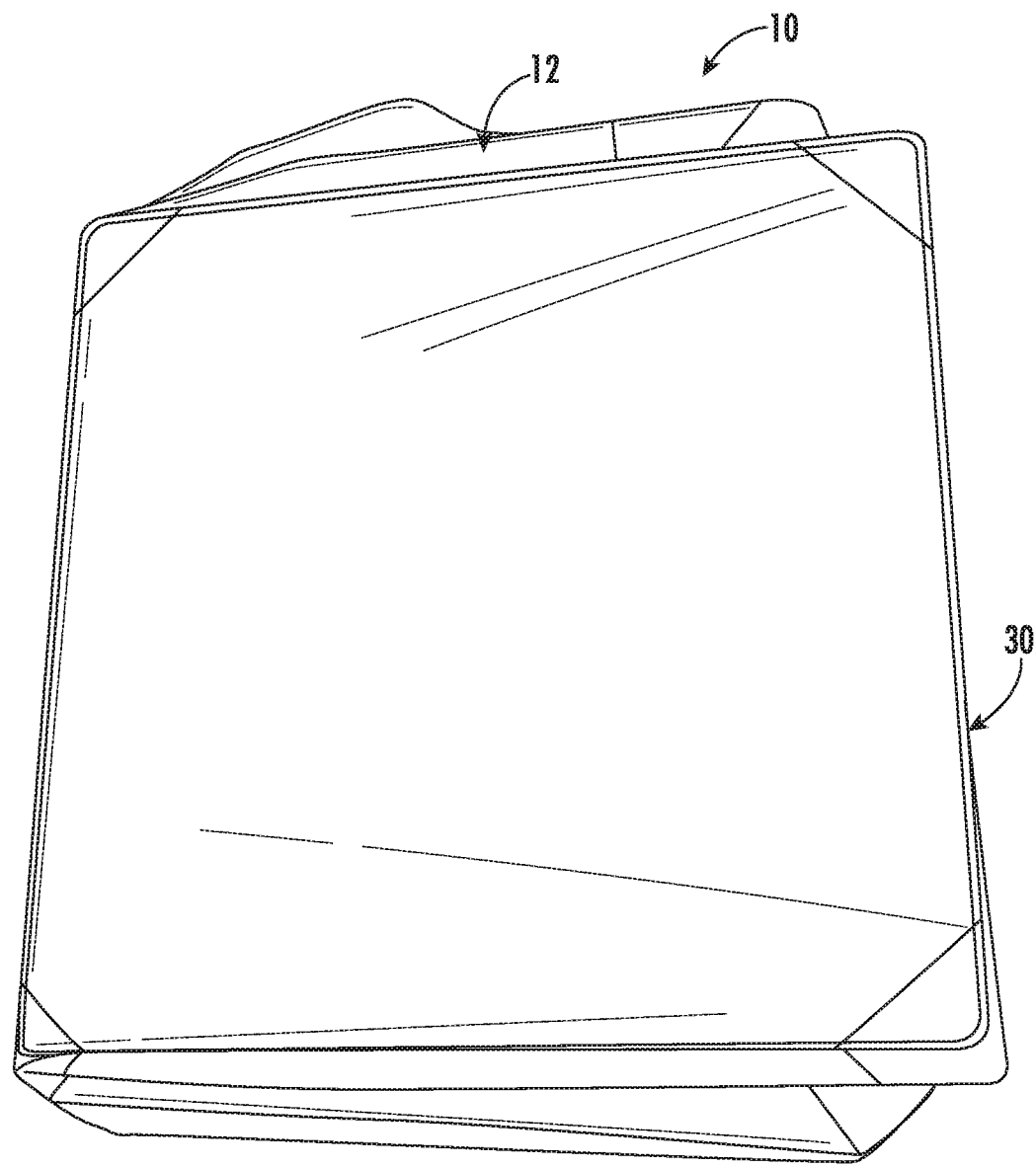
FIG. 17 is a view showing the cloth enclosure and frame assembly in a collapsed state.
Figure 18:
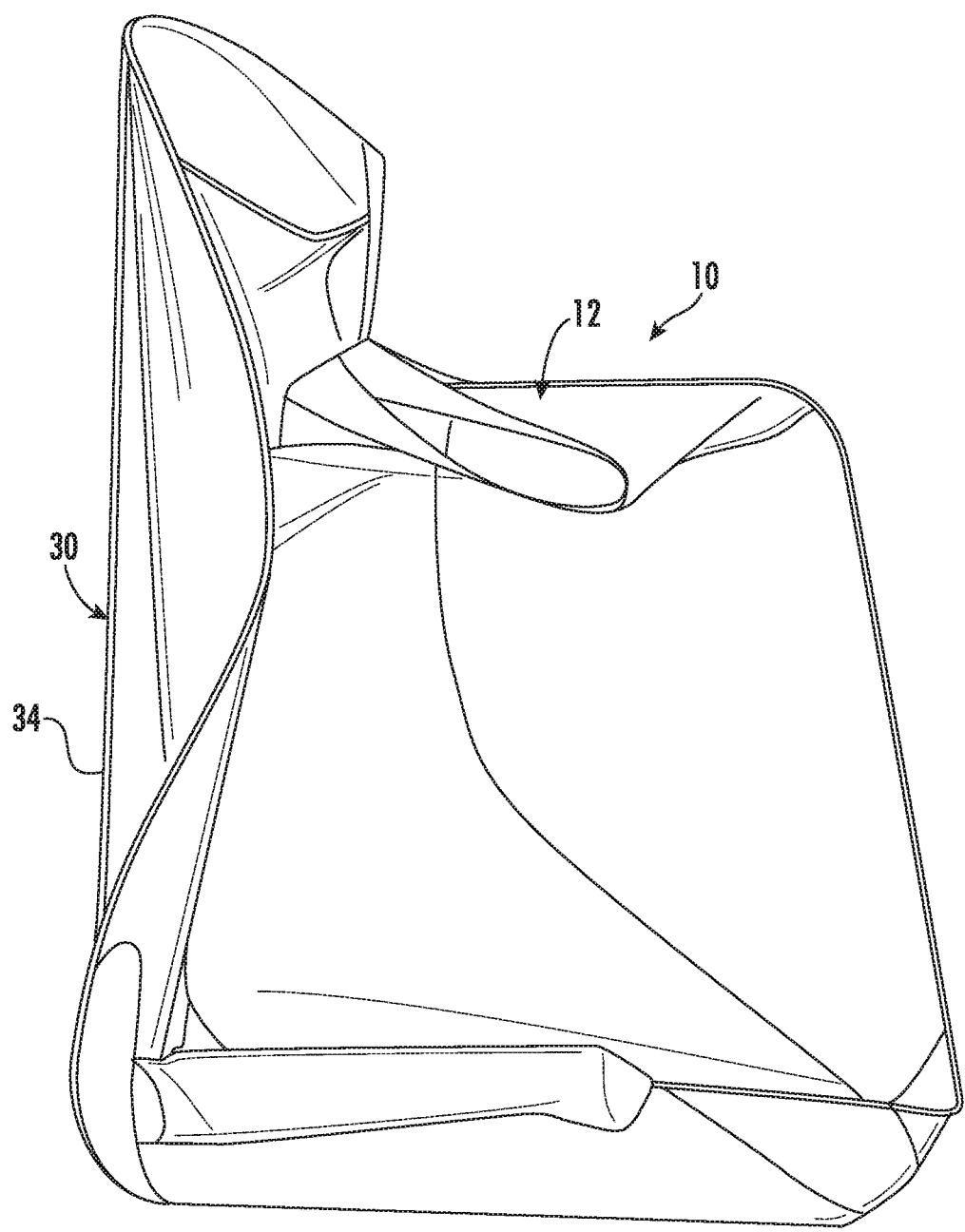
FIG. 18 is a perspective view showing the assembled frame assembly and cloth enclosure in a partially assembled state.
Figure 19:
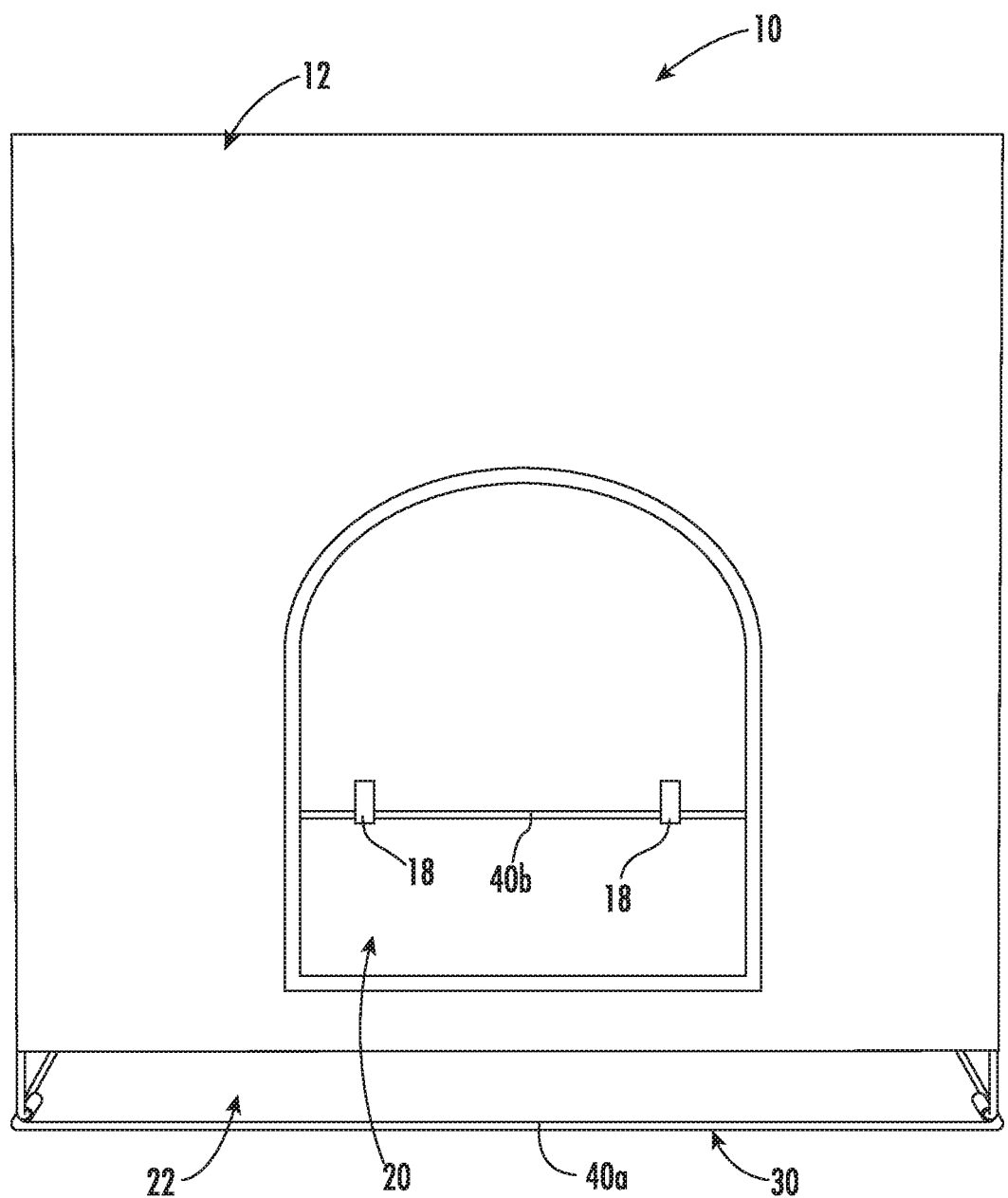
FIG. 19 is a perspective view showing the frame assembly and cloth enclosure in a fully assembled state.
Figure 20:
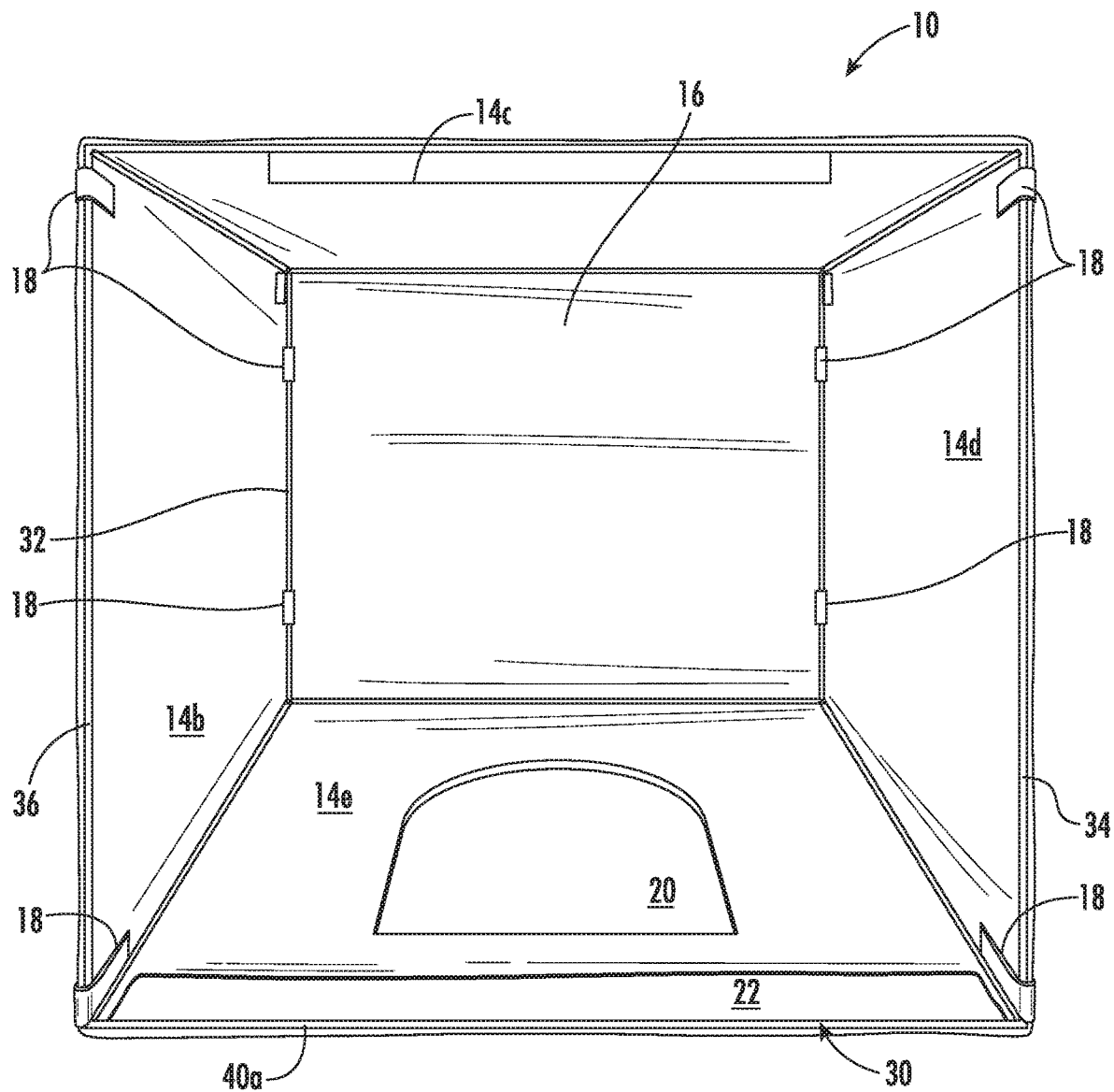
FIG. 20 is a bottom view of the assembled frame assembly and cloth enclosure.
Figure 21:
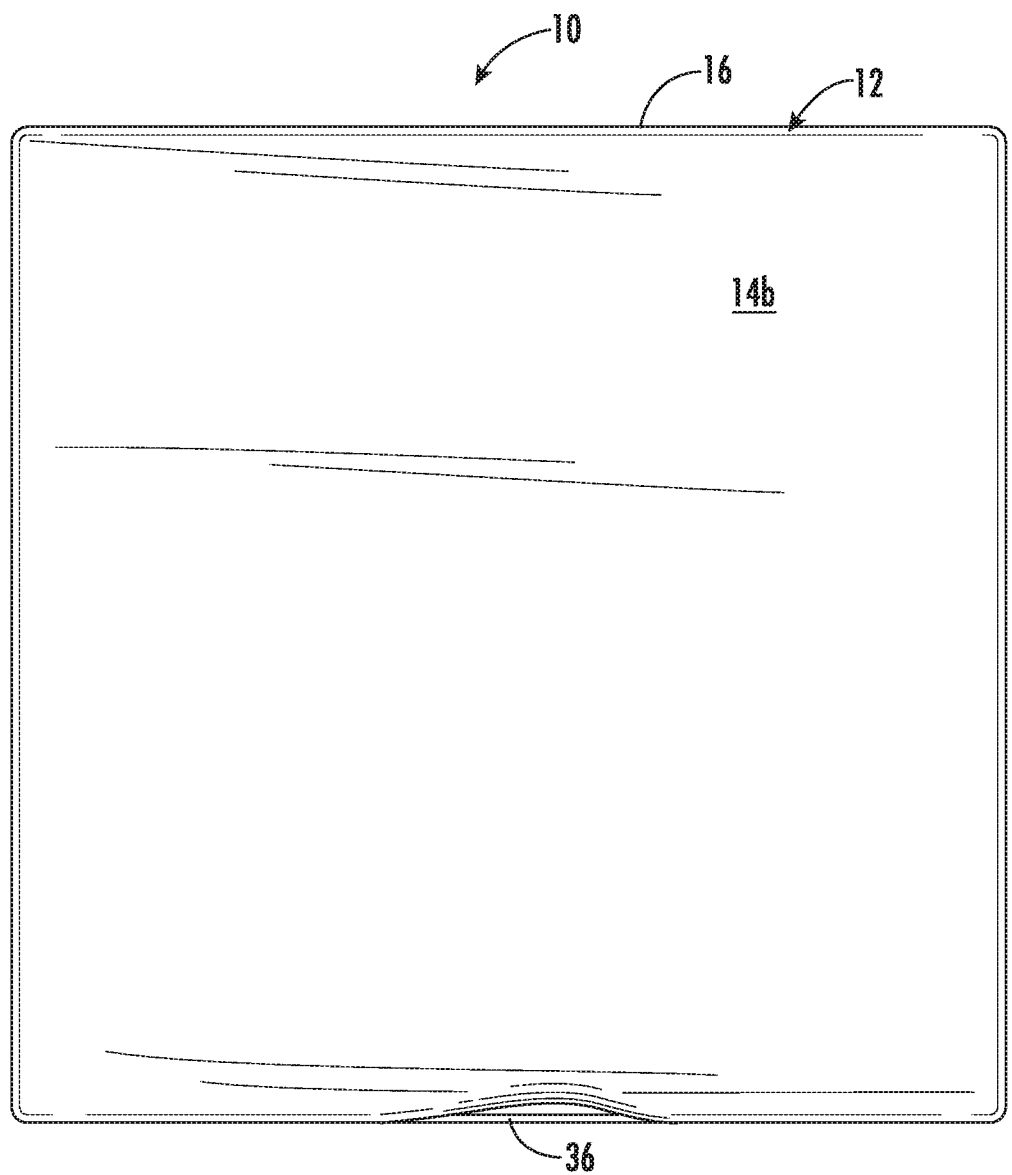
FIG. 21 is a right side elevational view of the assembled frame assembly and cloth enclosure.
Figure 22:
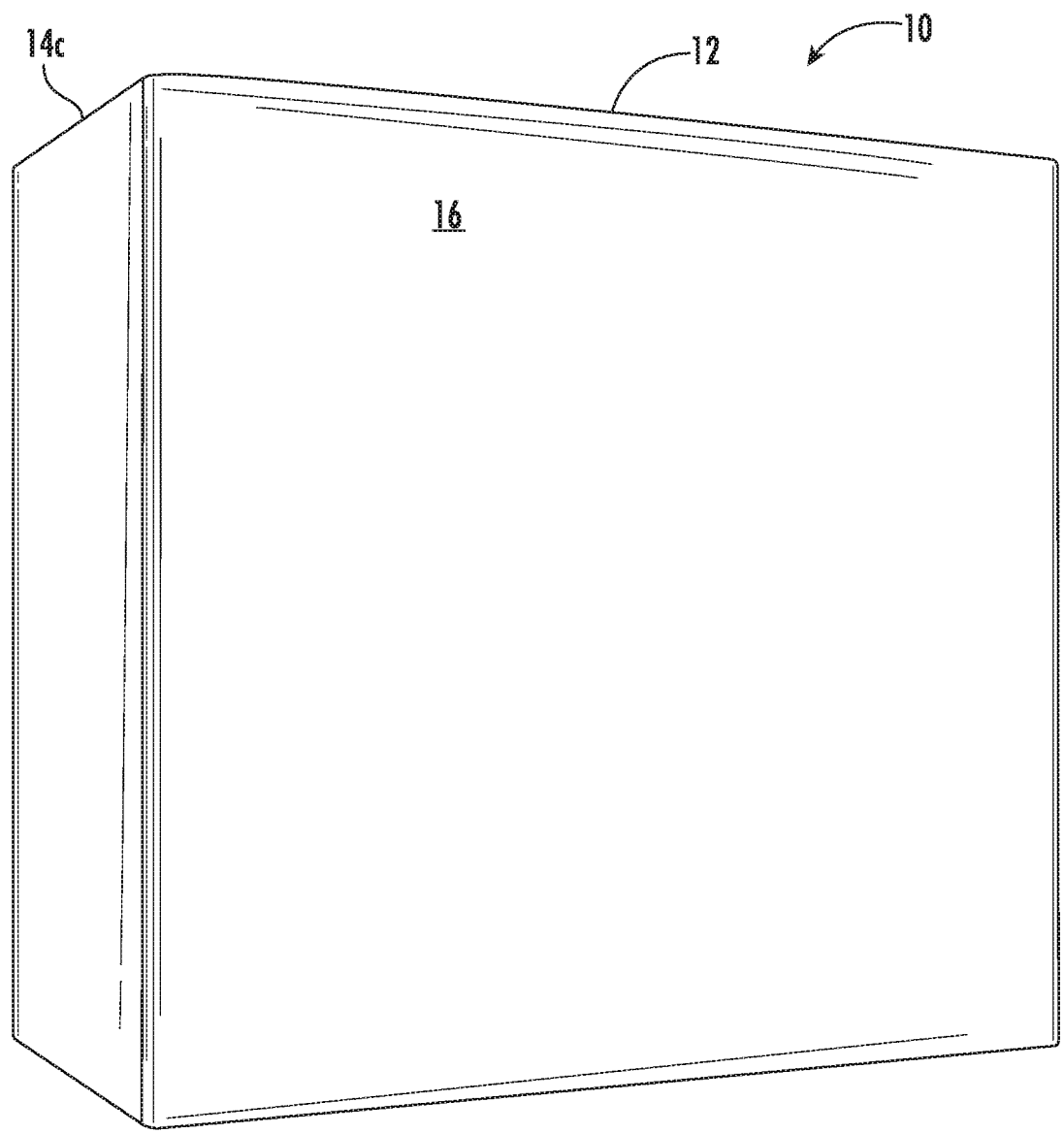
FIG. 22 is a top, rear perspective view of the assembled frame assembly and cloth enclosure.
Figure 23:
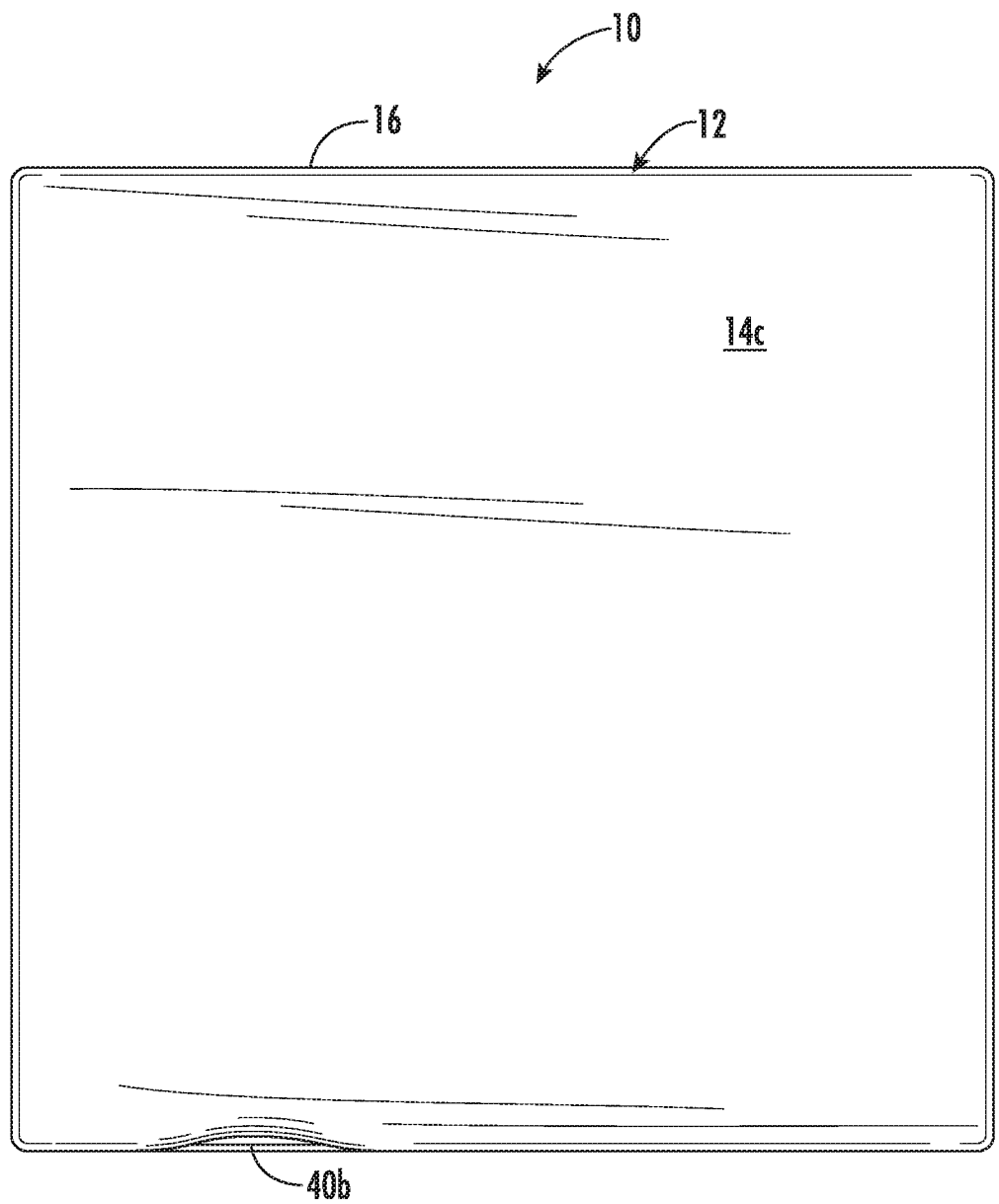
FIG. 23 is a rear elevational view of the assembled frame assembly and cloth enclosure.

The cloth enclosure 12 can be made of canvas, vinyl, or any woven material and is preferably sewn together at the interfaces between the sidewalls 14a, 14b, 13c, 14d, and the top 16. Reinforcements may be provided at the corners. The tie straps 18 hold the cloth enclosure 12 in position on the frame assembly 30 as it is moved between a collapsed position as shown in FIG. 17 through an intermediate position, as shown in FIG. 18, to an assembled position, as shown in FIGS. 1 and 19-23. The tie straps 18 allow the cloth enclosure 12 to be removed from the frame assembly 30 so that it can be washed or otherwise cleaned as necessary.

Referring now to FIGS. 2-9, a preferred embodiment of the frame assembly 30 that supports the cloth enclosure 12 is shown in detail. The frame assembly 30 includes a top frame 32, preferably comprising four edge members 33a-33d that are connected together to define a generally rectilinear structure. First and second side members 34, 36 are connected to the top frame 32. The connection of the first and second side members 34, 36 is preferably via a pivotal connection on opposite ones of the edge members 33b, 33d. This pivoting can be accomplished using hinge barrels 38 connected to the edge members 33b, 33d and the first and second side frame 34, 36 may include bent ends that are engaged in the hinge barrels 38 to allow pivoting movement. The first and second side frame 34, 36 are preferable U-shaped and the bent ends are located at the two ends of the U. As shown in detail in FIG. 6, which illustrates the frame assembly 30 laying on its back with two optional center frame members 46 that extend between the opposite edge members 33b, 33d of the top frame 32 as an additional support for the top 16 of the cloth enclosure 12, cross-members 40a, 40b are provided that are connected between opposite sides of the first and second side frames 34, 36 from the top frame 32. The cross-members 40a, 40b are engagable via bent ends 42a, 42b of the cross-members 40a, 40b engaging in receptacles 44 fastened to the other first and second side frames 34, 36. As shown in detail in FIGS. 7 and 8, the bent ends 42a, 42b of the cross-members 40a, 40b are insertable and removable from the receptacles 44 by simply pushing them into position once aligned. This allows for easy assembly of the frame assembly 30 to an upright position for use.

As shown in FIGS. 2-9, the top frame 32, the first and second side frames 34, 36, as well as the cross-members 40*a*, 40*b* and the optional center members 46 are formed of solid wire bar-stock. However, they could be made of tubular stock. In a preferred embodiment, the bar-stock is formed of steel. However, it could be made of other materials, such as fiberglass, if desired.

Figure 2:
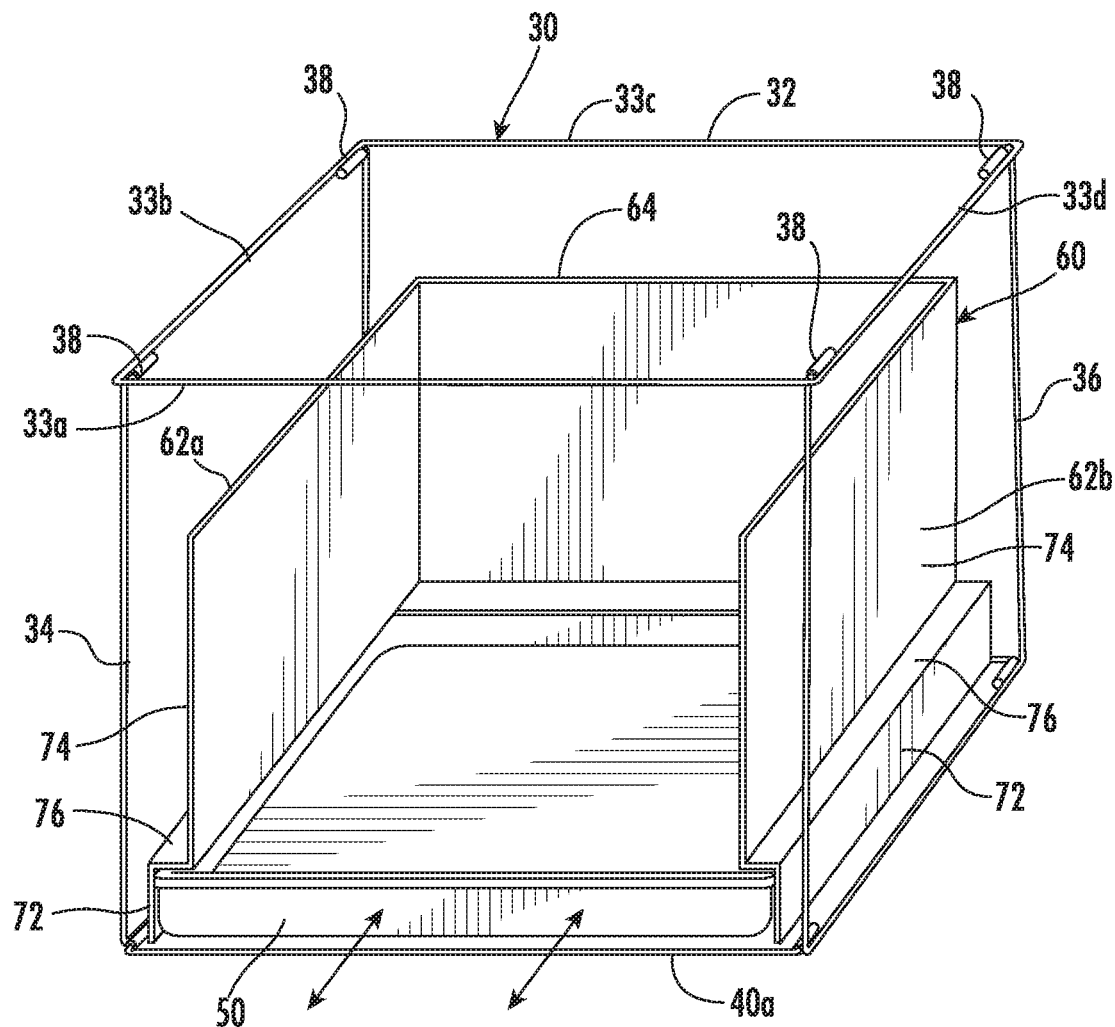
FIG. 2 is a top, front, right perspective view of the Pet Privy System with the cloth enclosure removed in order to illustrate the internal structure.
Figure 7:
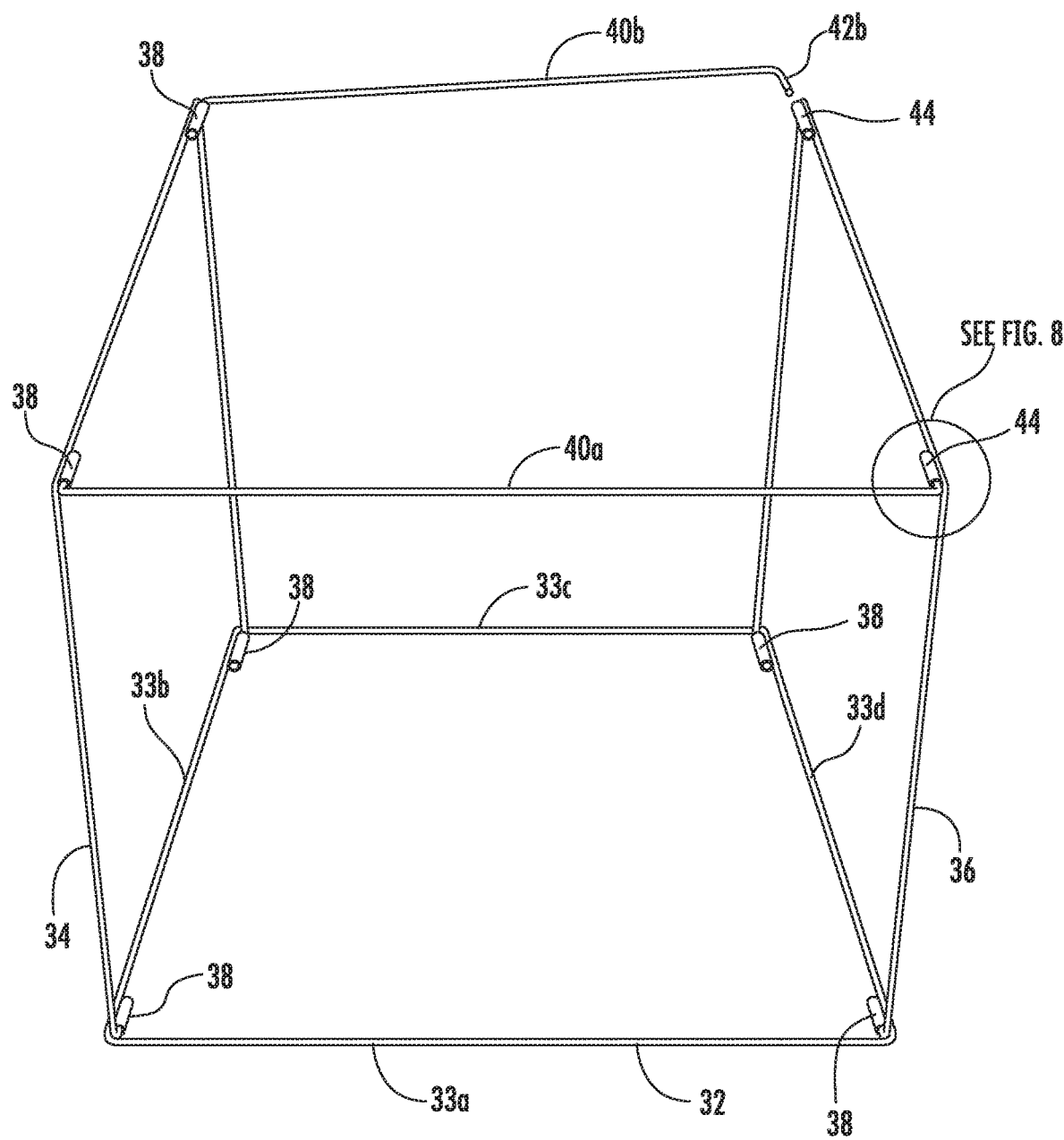
FIG. 7 is a perspective view of the frame assembly with one of the cross-members engaged.
Figure 8:
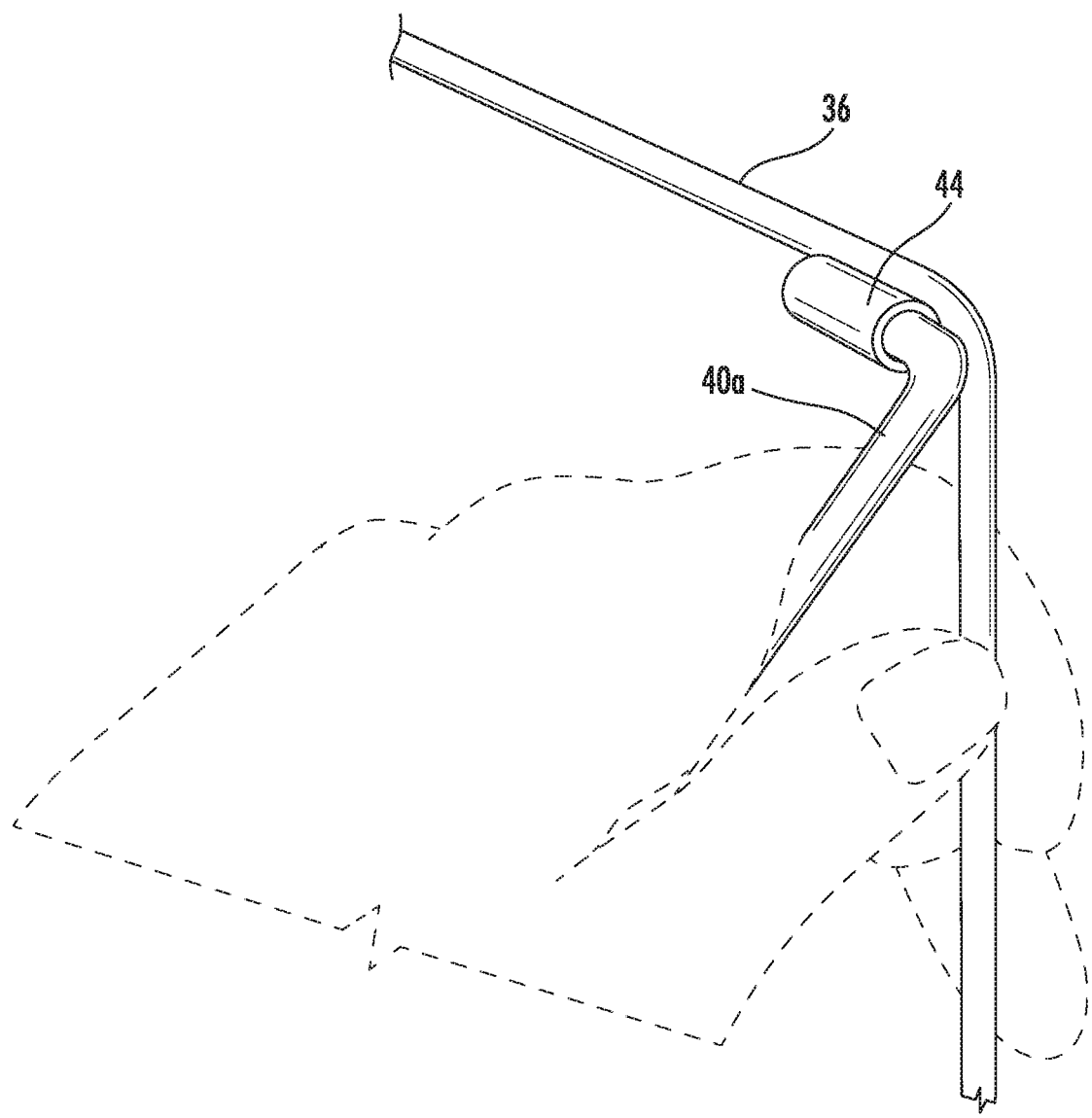
FIG. 8 is an enlarged detail taken from FIG. 7 showing the engagement of the cross-member in order to assemble the frame assembly.
Figure 9:
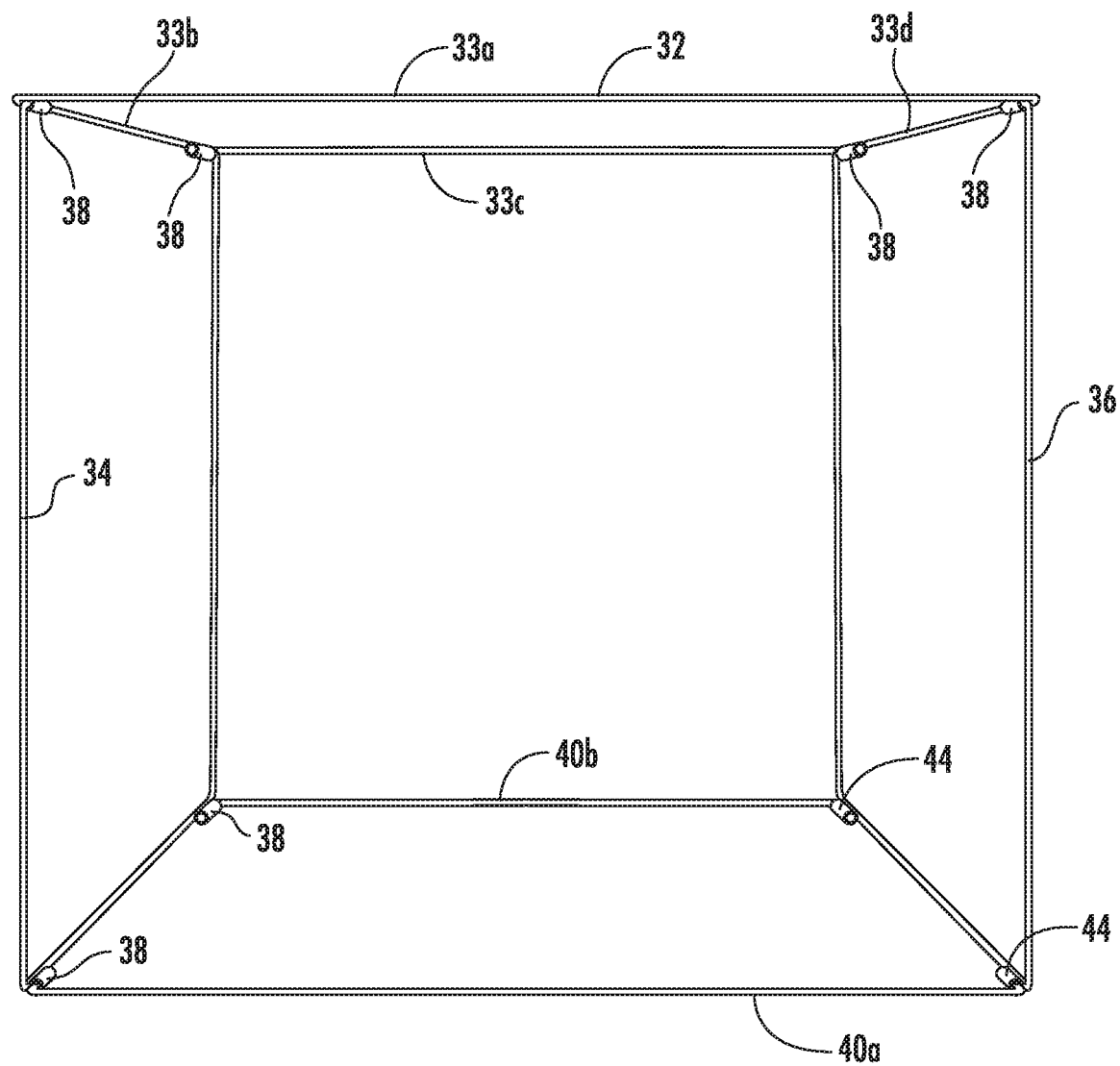
FIG. 9 is a perspective view showing the assembled frame assembly.

While FIGS. 7 and 8 show the connection of the bent ends 42*a*, 42*b* of the cross-members 40*a*, 40*b* into the receptacles 44, FIGS. 2 and 9 show the frame assembly 30 in the fully assembled condition.

Figure 24:
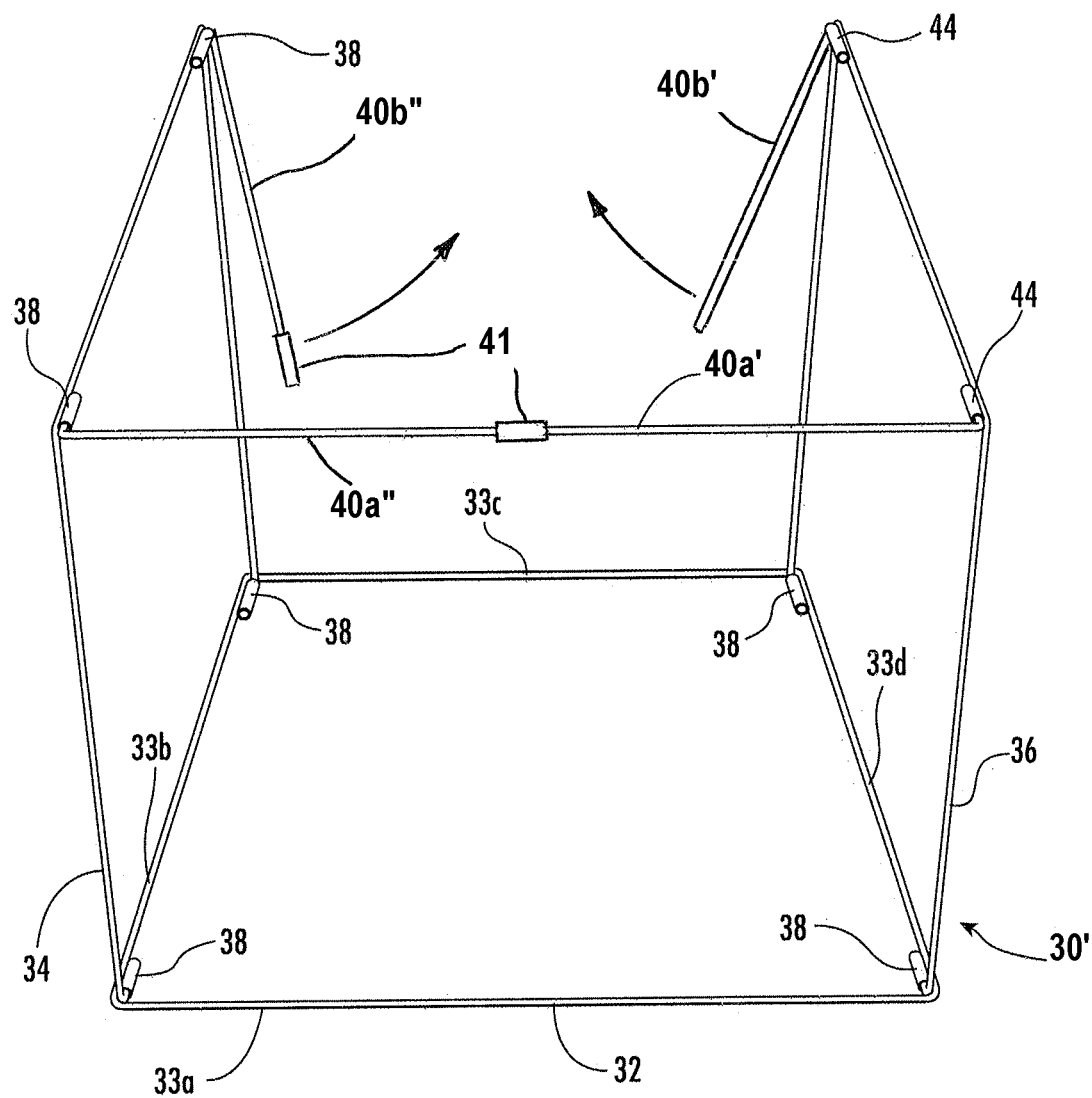
FIG. 24 is a perspective view similar to FIG. 5 of an alternate embodiment of the frame assembly showing the first and second sidewalls in the assembled state and a first split cross-member in an assembled state and a second split cross-member being pivoted toward one another for assembly.
Figure 25:
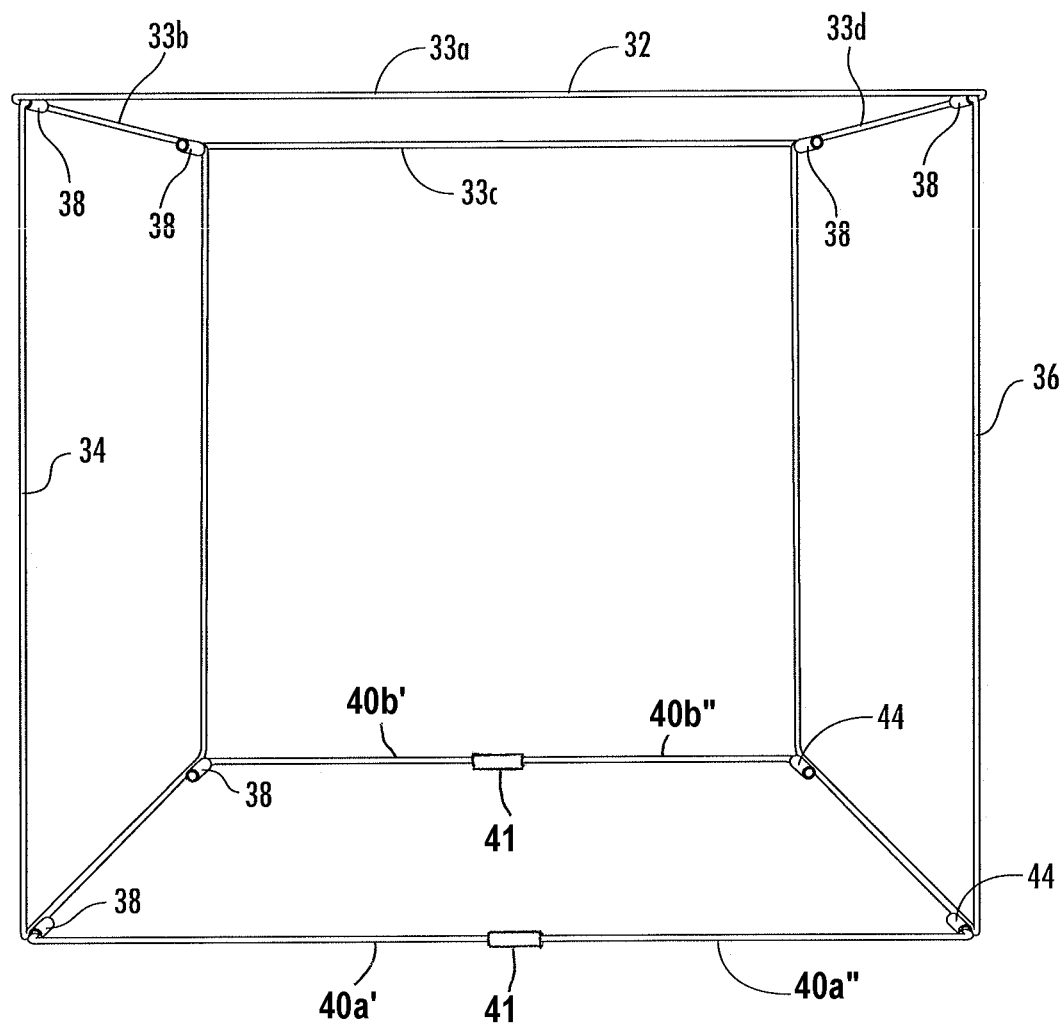
FIG. 25 is a perspective view showing the assembled frame assembly of FIG. 24.
Figure 26:
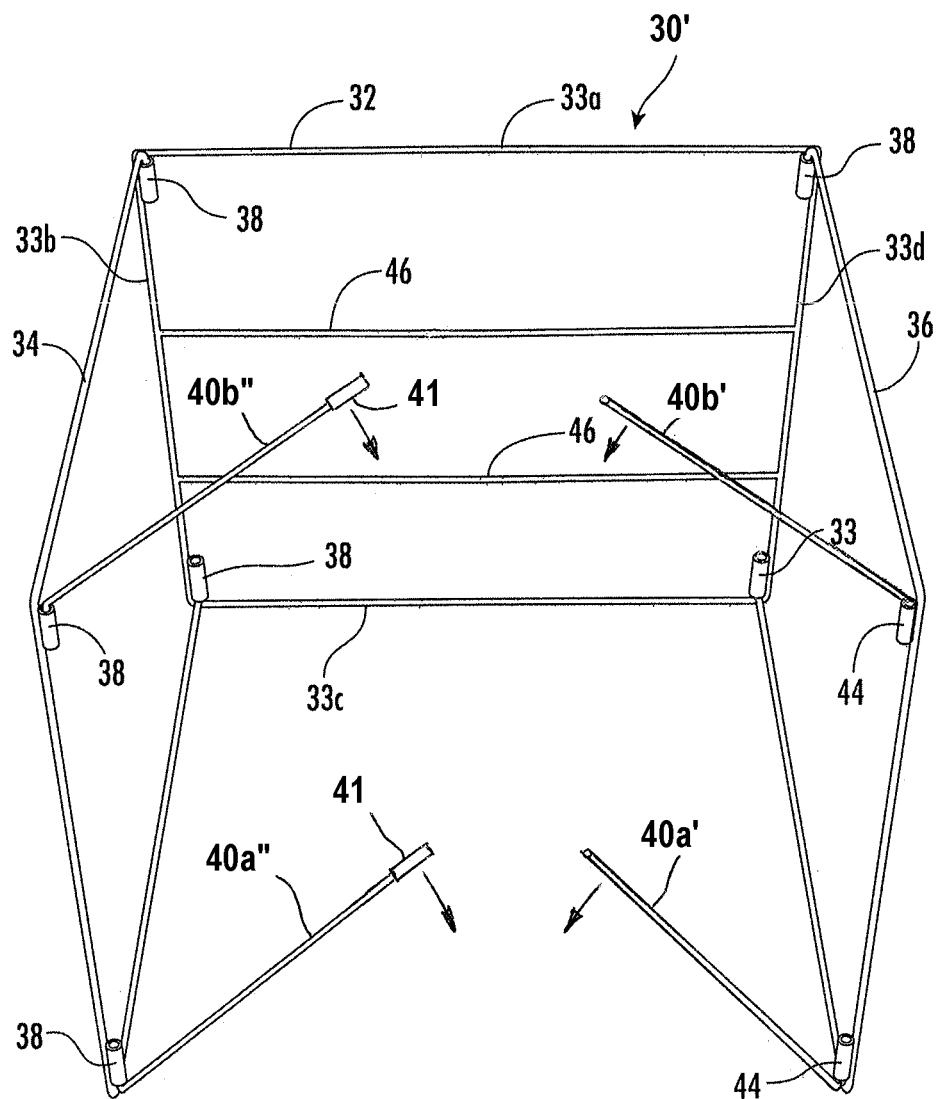
FIG. 26 is a perspective view of the alternate embodiment of the frame assembly of FIG. 24 showing the two split cross-members being pivoted to the assembled position, and also showing optional center frame members that extend between the opposite edge members of the top frame.

Referring now to FIGS. 24-26, an alternate embodiment of the frame assembly 30' is shown. The frame assembly 30' is interchangeable with the frame assembly 30, and only differs in that the frame assembly 30' includes split cross-members that are used to form the bottom. As shown in FIG. 24, in which the frame assembly 30' is up-side down for assembly, the first split cross-member is shown assembled with first split cross-member part 40*a'* and second split cross-member part 40*a''* engaged using a barrel connector 41 that is connected to the free end of the second split cross-member part 40*a''* and the free end of the first split cross-member part 40*a'* is inserted in the open end of the barrel connector 41. The barrel connector 41 is preferably formed as a tube having an inner diameter that is sized to receive a free end of the first split cross-member part 40*a'*. The second split cross-member is shown prior to assembly a first split cross-member part 40*b'* and a second split cross-member part 40*b''* having the barrel connector 41 on the free end. The pivot ends of the split cross-member parts 40*a'*, 40*a''*; 40*b'*, 40*b''* are formed as bent ends that are engaged in the hinge barrels 38 located on the bottoms of the of the first and second side members 34, 36. FIG. 25 shows the frame assembly 30' in the assembled state. The frame assembly 30' is typically assembled with the cover 12 installed, which provides the tension necessary to keep the split cross-members together once assembled FIG. 26 shows the frame assembly 30' with the respective split cross-members formed by the respective the split cross-member parts 40*a'*, 40*a''*; 40*b'*, 40*b''* disassembled. Here the optional center frame members 46 that extend between the opposite edge members 33*b*, 33*d* of the top frame 32 as an additional support for the top 16 of the cloth enclosure 12 are shown.

Figure 16:
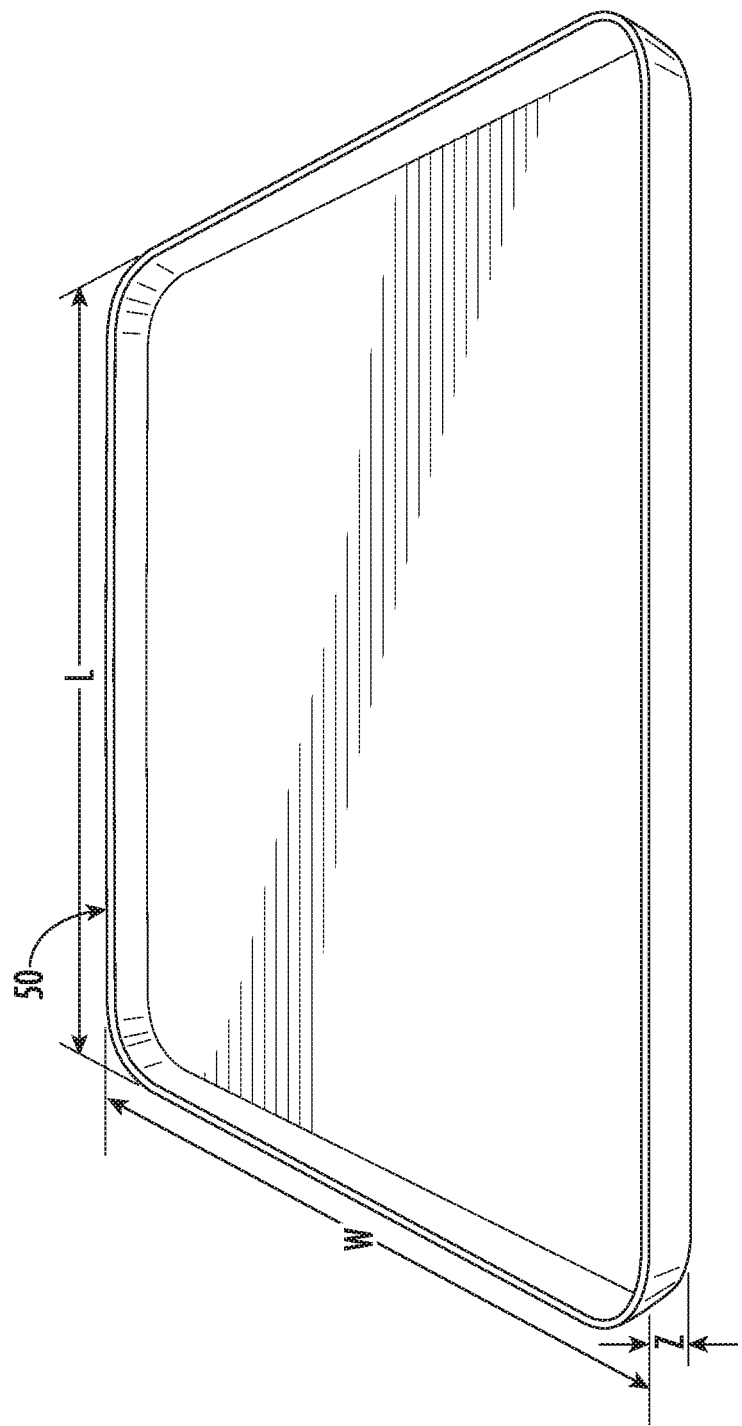
FIG. 16 is a perspective view of a removable pan used in connection with the Pet Privy System.

Referring now to FIG. 16, the removable protective bottom part, preferably in the form of the pan 50 is shown in detail. The pan 50 is preferably made of a polymeric material and has a length L and a width W. The length L is less than a distance X between the first and second side frames 34, 36, allowing the removable pan 50 to be slideable on the floor or other support surface between the first and second slide frames 34, 36, into the installed position shown in FIG. 1. This is accomplished by sliding the removable pan 50 through the pan opening 52 of the cloth enclosure 12 located along a bottom of the frame assembly 30. Preferably, the pan 50 also has a lip 52 with a defined height Z. While the pan 50 is preferred, the protective removable bottom part could be a vinyl matt, artificial turf with a sealed bottom and edges, or similar protective barrier.

Figure 3:
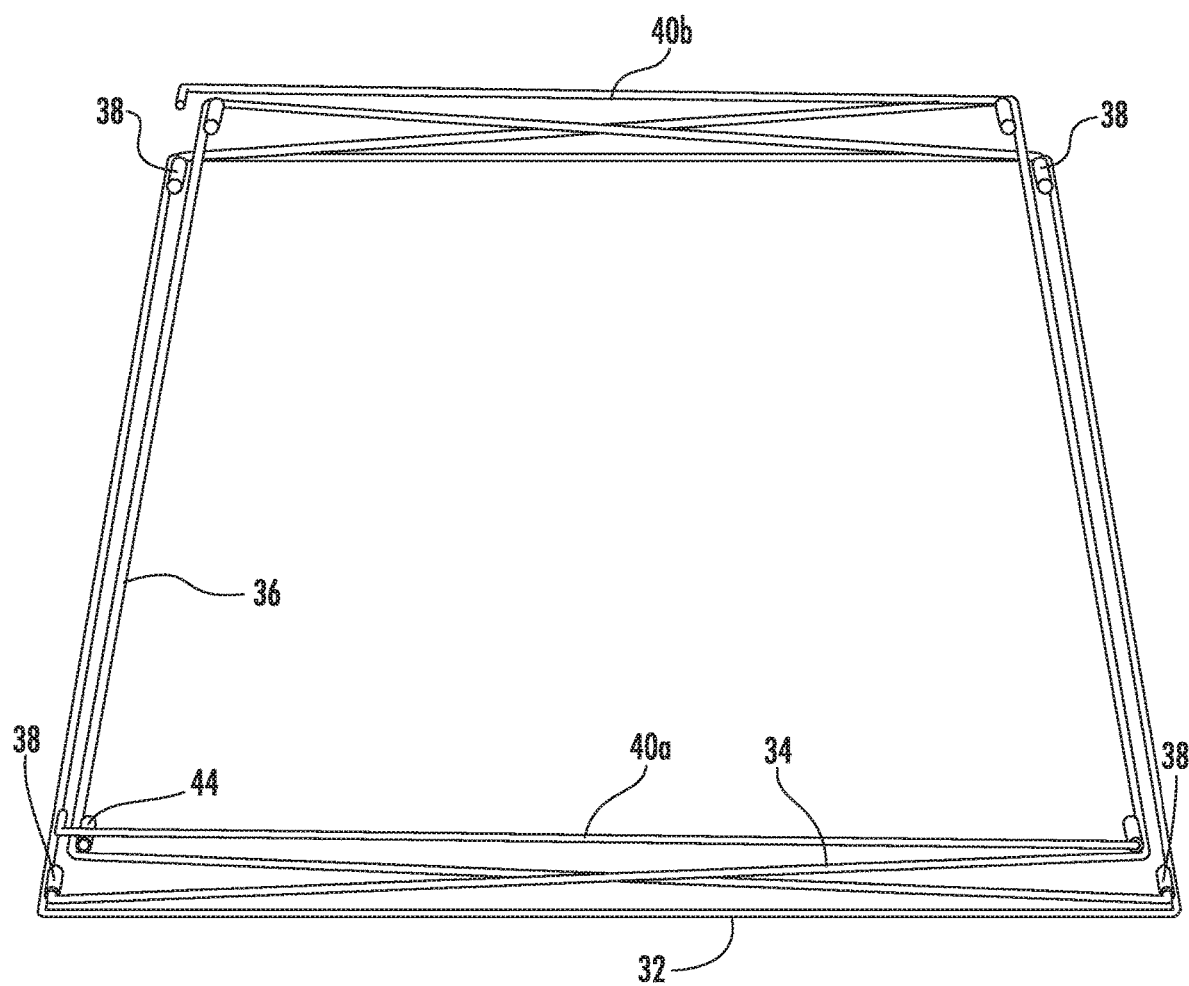
FIG. 3 is a view of the frame assembly in a collapsed state.
Figure 4:
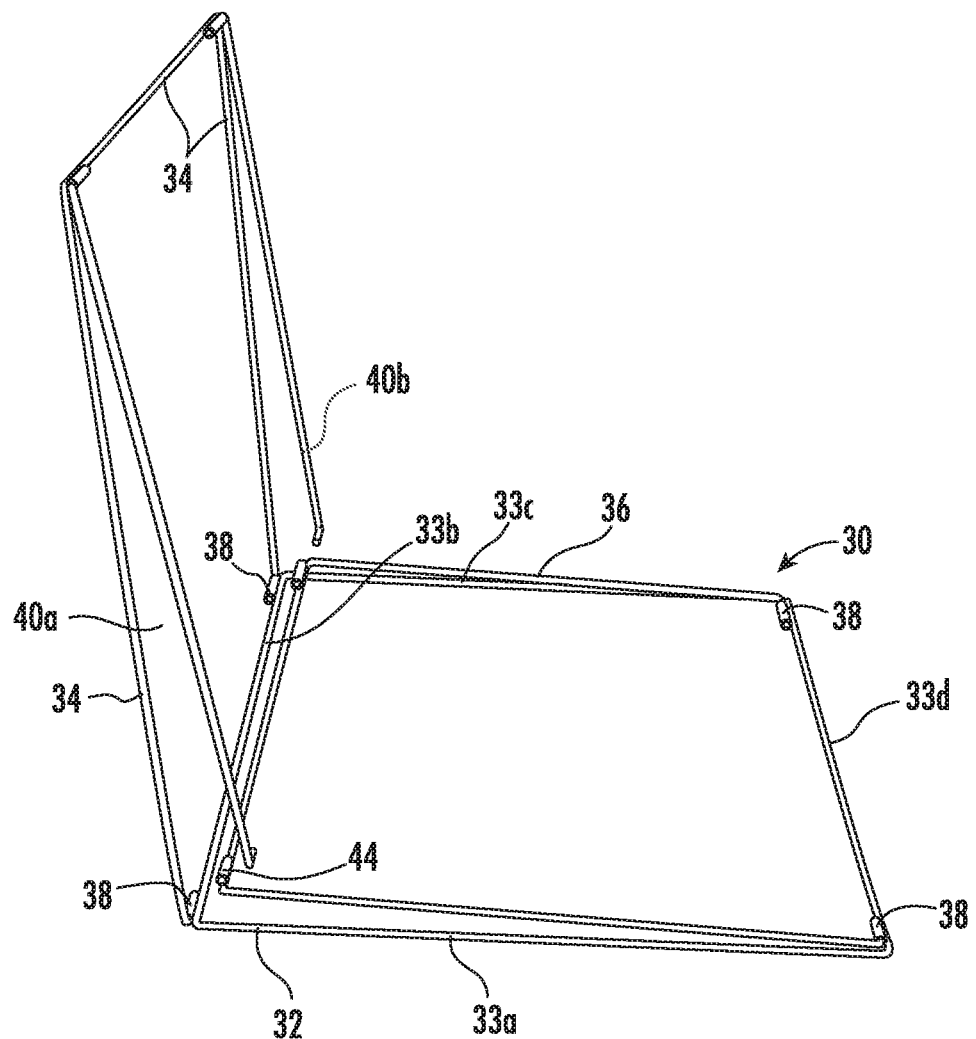
FIG. 4 is a view of the frame assembly with one side being moved toward an assembled state.
Figure 5:
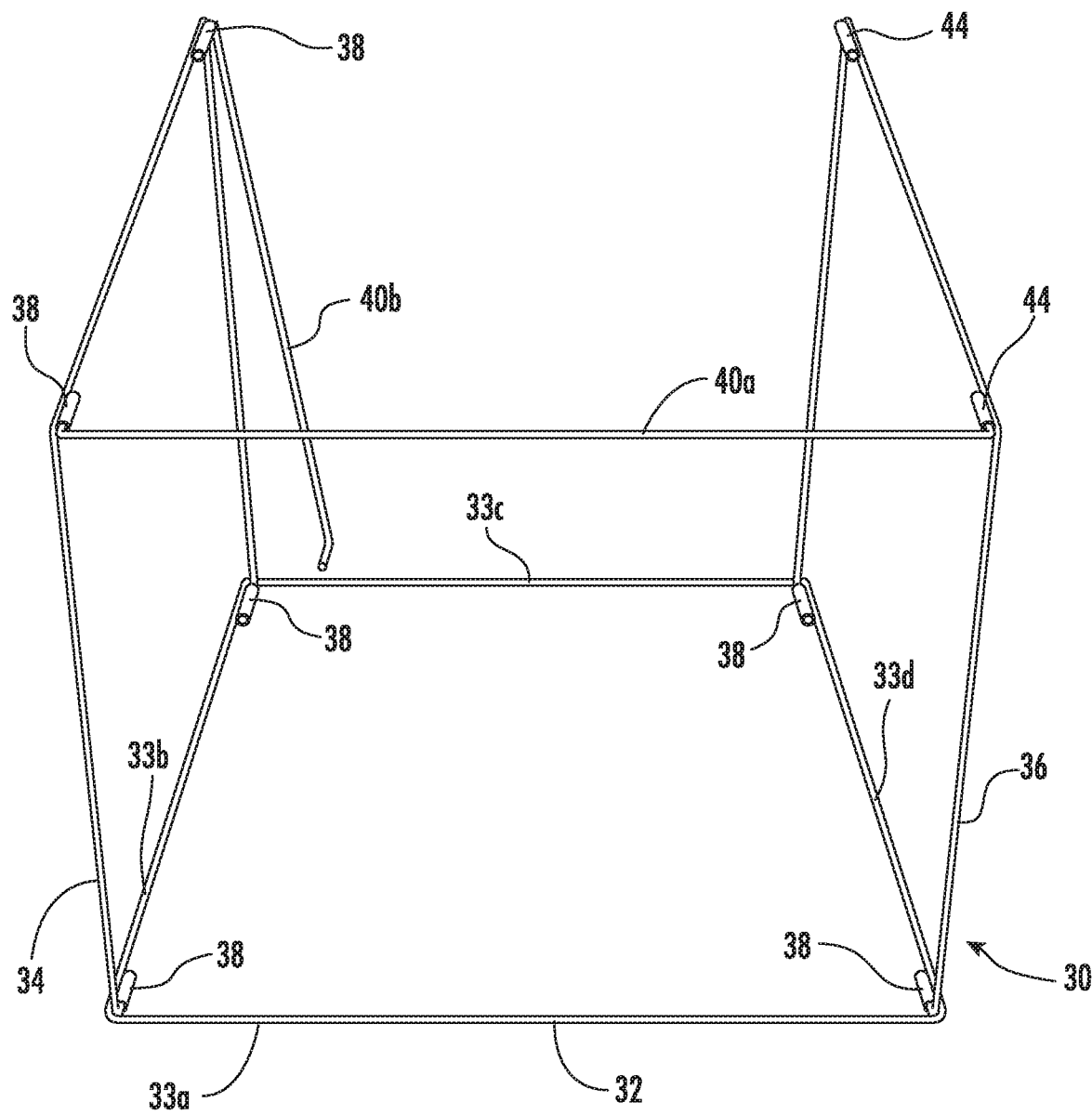
FIG. 5 is a perspective view of the frame assembly of FIG. 3 now showing the first and second sidewalls in the assembled state.
Figure 6:
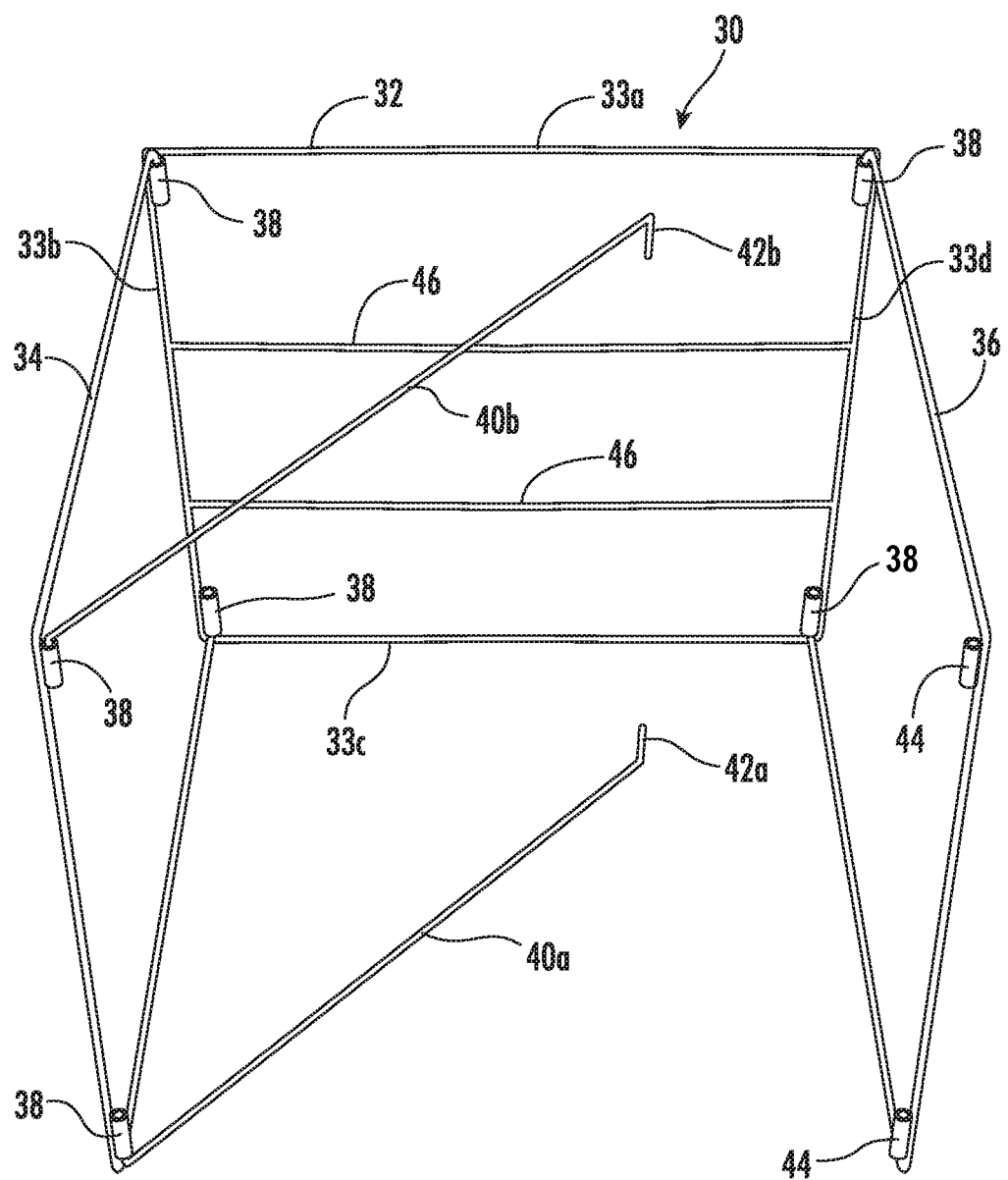
FIG. 6 is a perspective view of the frame assembly of FIG. 3 showing the two cross-members of the frame assembly being pivoted to the assembled position.

In order to assemble the frame assembly, which is preferably shipped with the attached cloth enclosure 12, the frame assembly 30 is unfolded from a collapsed position, as shown in FIGS. 3 and 17 in which the cross-members 40*a*, 40*b*, and the first and second side frame 34, 36 are aligned on and generally in a plane parallel to the top frame 16. The frame assembly 30 with the attached cloth enclosure 12 is then moved through intermediate positions, illustrated without the cloth enclosure 12 in FIGS. 4-7 and with the cloth enclosure in FIG. 18 to a position in which the first and second side frames 34, 36 are generally perpendicular to the top frame 16. The cross-members 40*a*, 40*b* are then connected between the first and second side frames 34, 36, as illustrated in detail in FIGS. 7 and 8 to define a plane generally parallel to the top frame 16. This plane defined by the cross-members 40*a*, 40*b* is preferably used as the bottom of the Pet Privy System 10 and the frame is rotated to that position once assembled. However, it can be in other positions as shown in the Figures during unfolding and assembly of the frame assembly 30. For the alternate frame assembly 30', the first split cross-member part 40*a'* and second split cross-member part 40*a''* are engaged using the barrel connector 41 that is connected to the free end of the second split cross-member part 40*a''* and the free end of the first split cross-member part 40*a'* is inserted in the open end of the barrel connector 41. The second split cross-member is assembled in a similar manner by the first split cross-member part 40*b'* and second split cross-member part 40*g''* being engaged using the barrel connector 41 that is connected to the free end of the second split cross-member part 40*b''* of the second split cross-member. The tension to hold the split cross-members together is provided by the cover 12, which is forced outwardly in order to make the connections.

As shown in FIG. 2, the width W of the pan 50 is less than a width Y of the first and second side frames 34, 36. This allows the pan to be easily slid into and out of the assembled frame assembly 30 with cloth enclosure 12.

Figure 10:
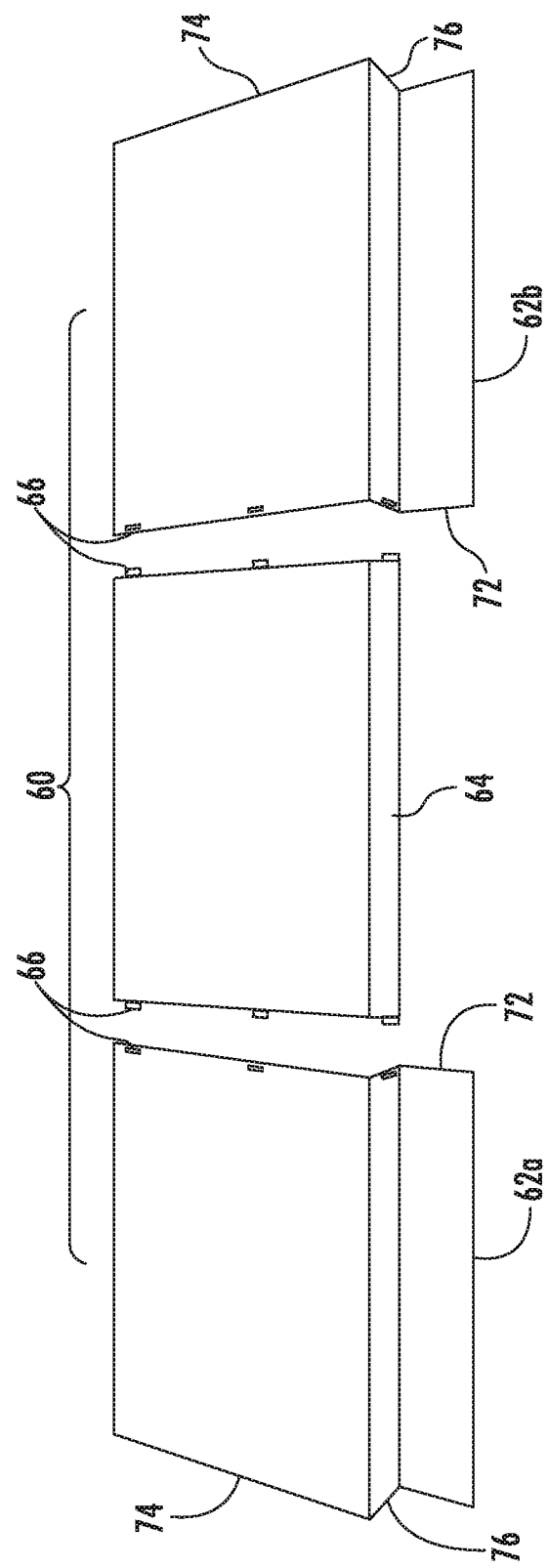
FIG. 10 is a view showing three pieces of the inner guard wall in the disassembled state.

Referring now to FIGS. 10-15, the inner guard wall 60 is shown in detail. In FIG. 10, the two sides 62*a* and 62*b* and back 64 are shown in the disassembled state. These parts are connected together to form the assembled inner guard wall 60 shown in FIGS. 12-15 which is then located inside the frame assembly 30 as shown in FIGS. 1 and 2. The sides 62*a*, 62*b* of the inner guard wall 60 are adapted to be located between the sidewalls 14*b*, 14*d* of the cloth enclosure 12 and the removable pan 50. The inner guard wall 60 acts to prevent, for example urine or feces from the pet from contacting the cloth enclosure 12 and directs any splatter into the pan 50. The two sides 62*a*, 62*b* and back 64 are preferably formed of a polymeric material having a surface which is easy to clean, for example using disinfectant wipes or other cleaning material. While preferred, the inner wall guard 60 can be omitted if the cover 12 is made of a waterproof or easily cleanable material, or has a smooth, waterproof and easily cleanable material, such as vinyl, adhered to the inner surface.

Figure 11:
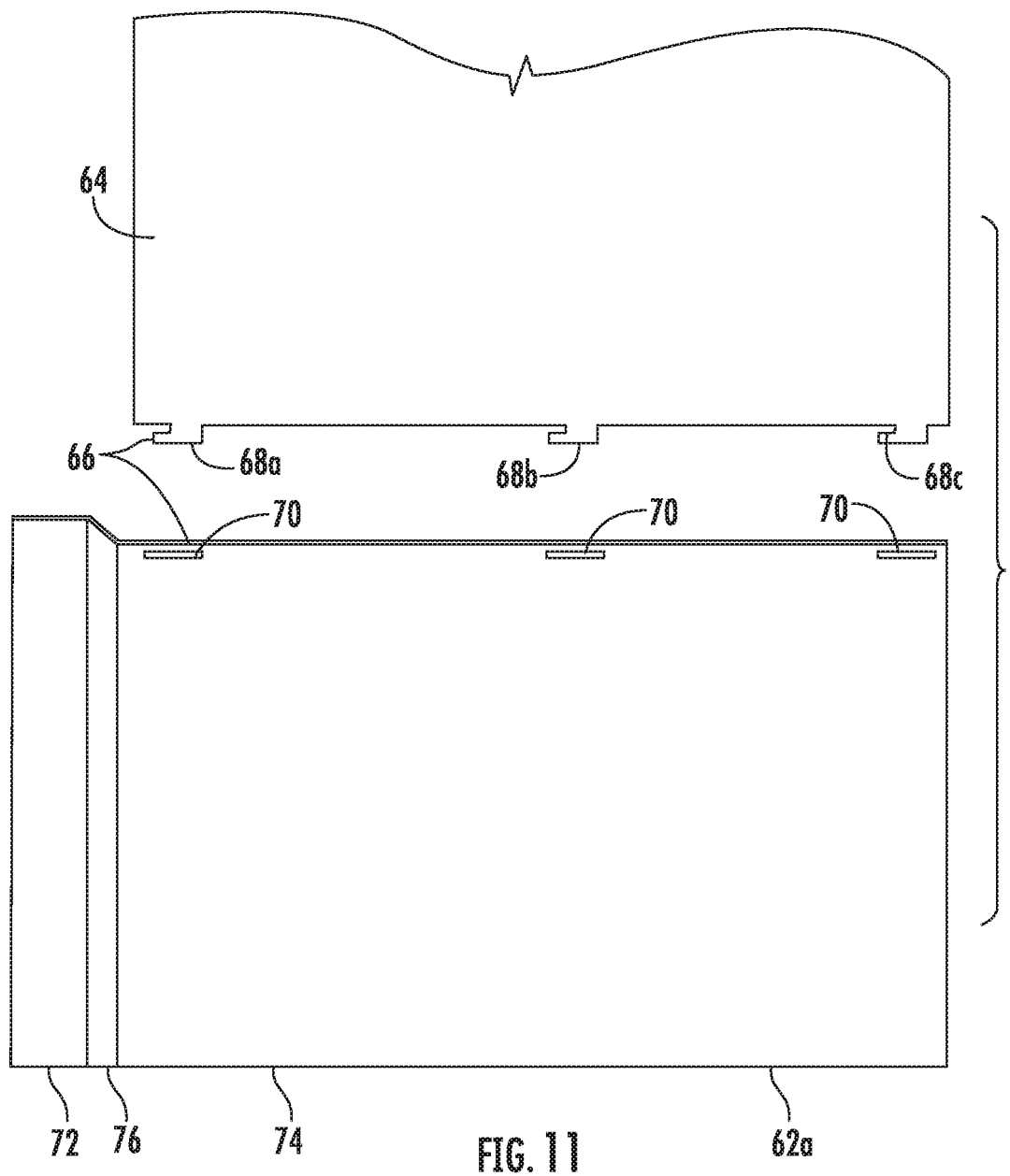
FIG. 11 is an enlarged detail showing the connection features between one of the sides and the back of the inner guard wall.
Figure 12:
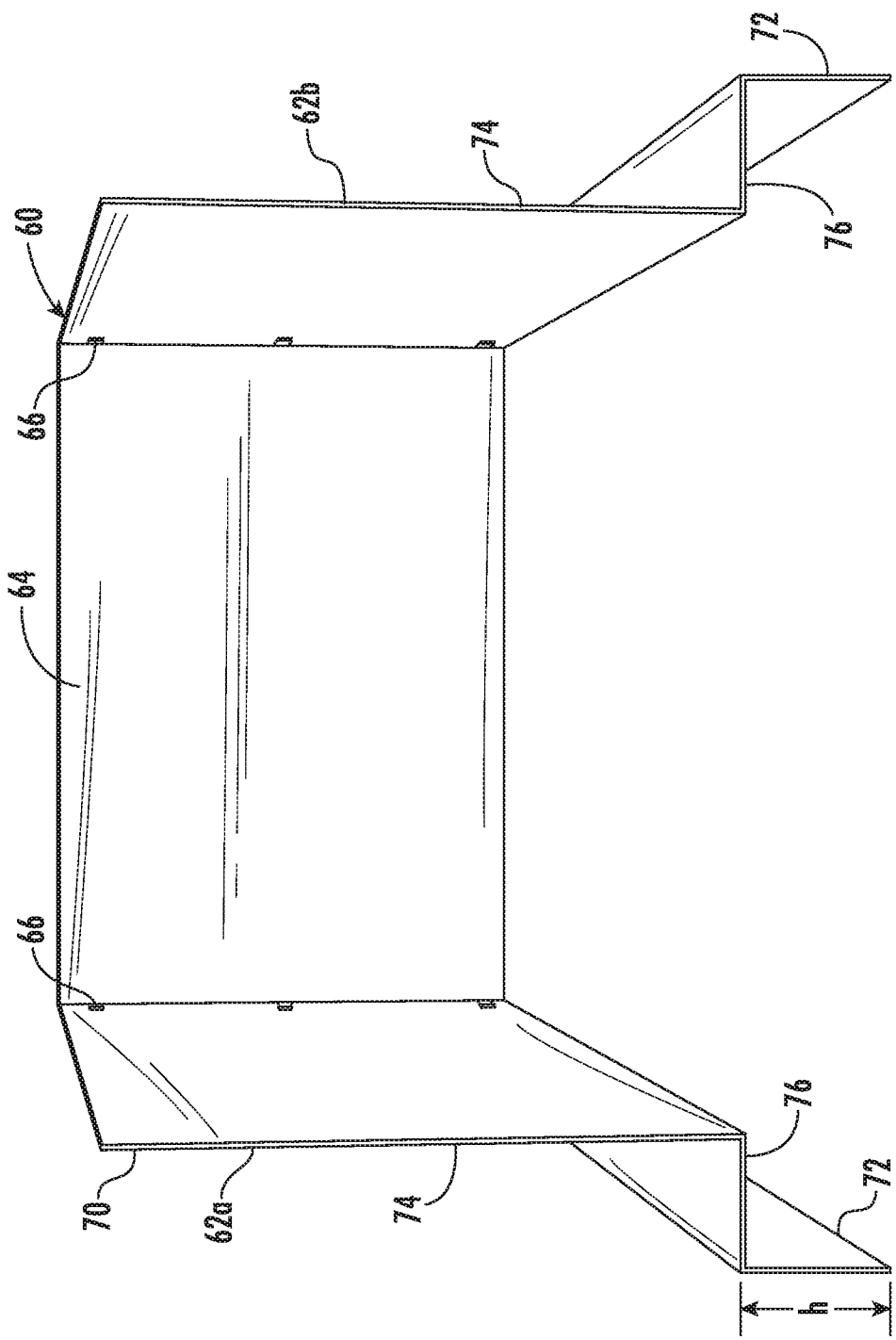
FIG. 12 is a front perspective view showing the assembled inner guard wall.
Figure 13:
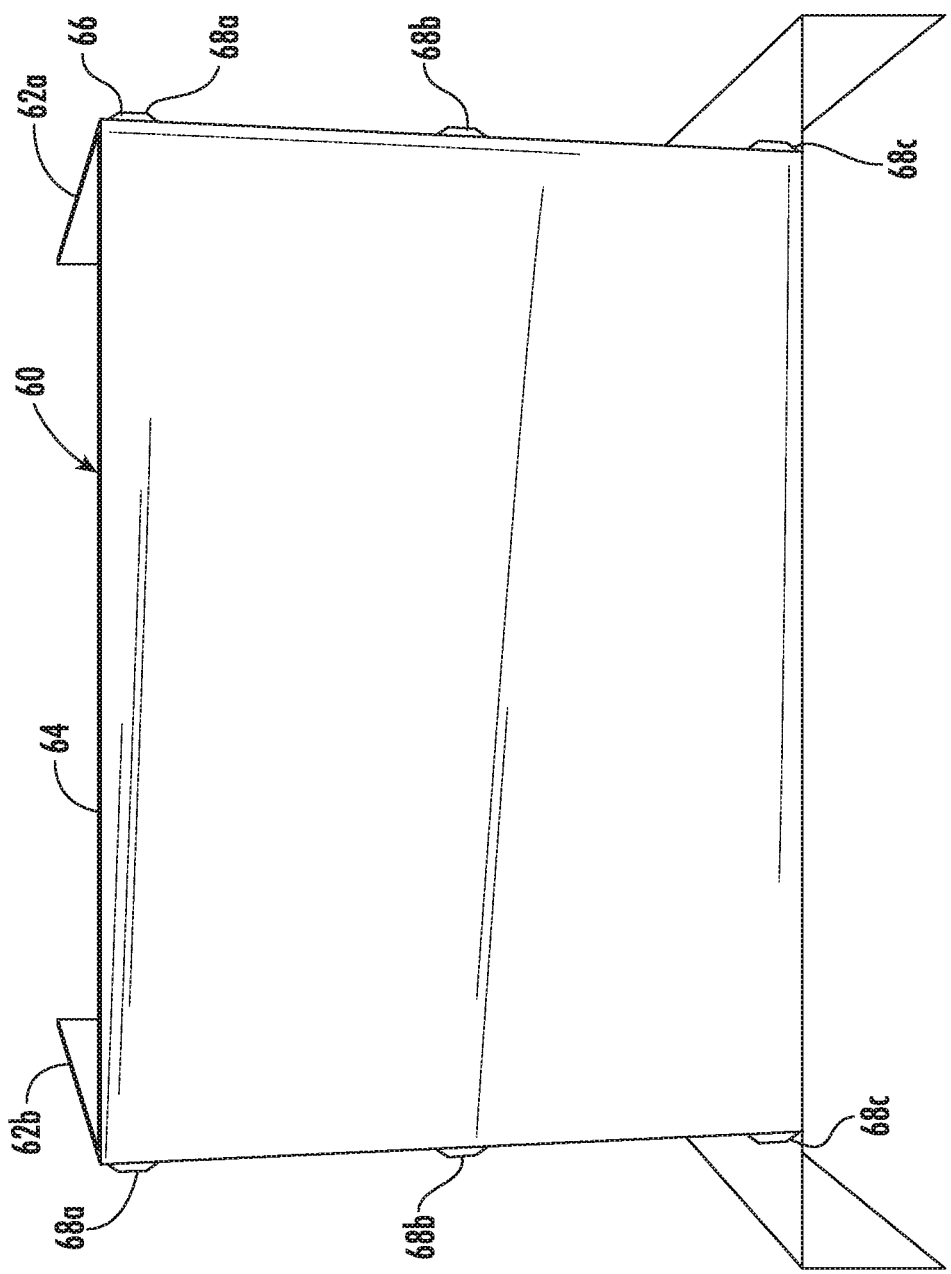
FIG. 13 is a rear perspective view showing the assembled inner guard wall.
Figure 14:
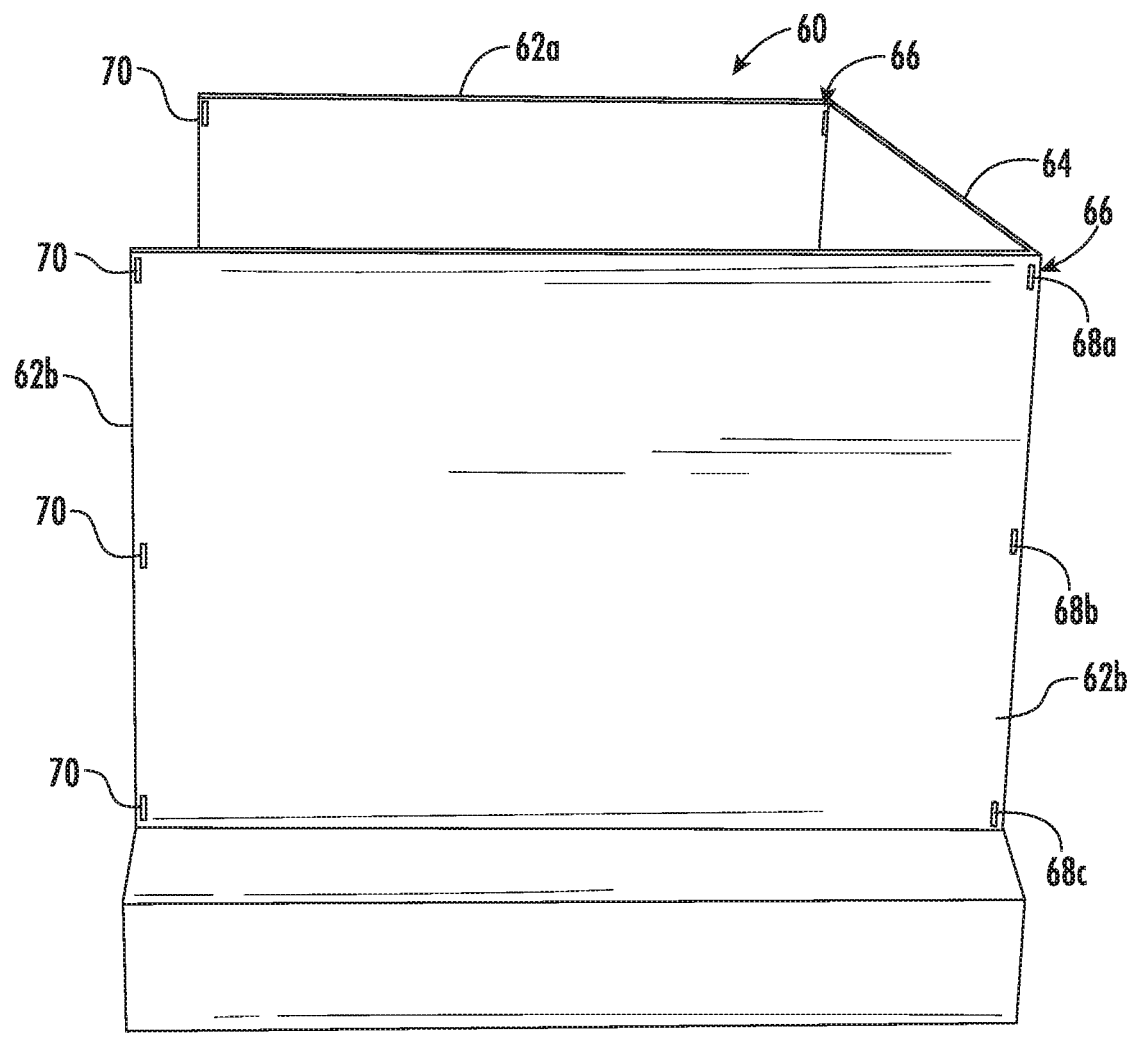
FIG. 14 is a right side view of the assembled inner guard wall.
Figure 15:
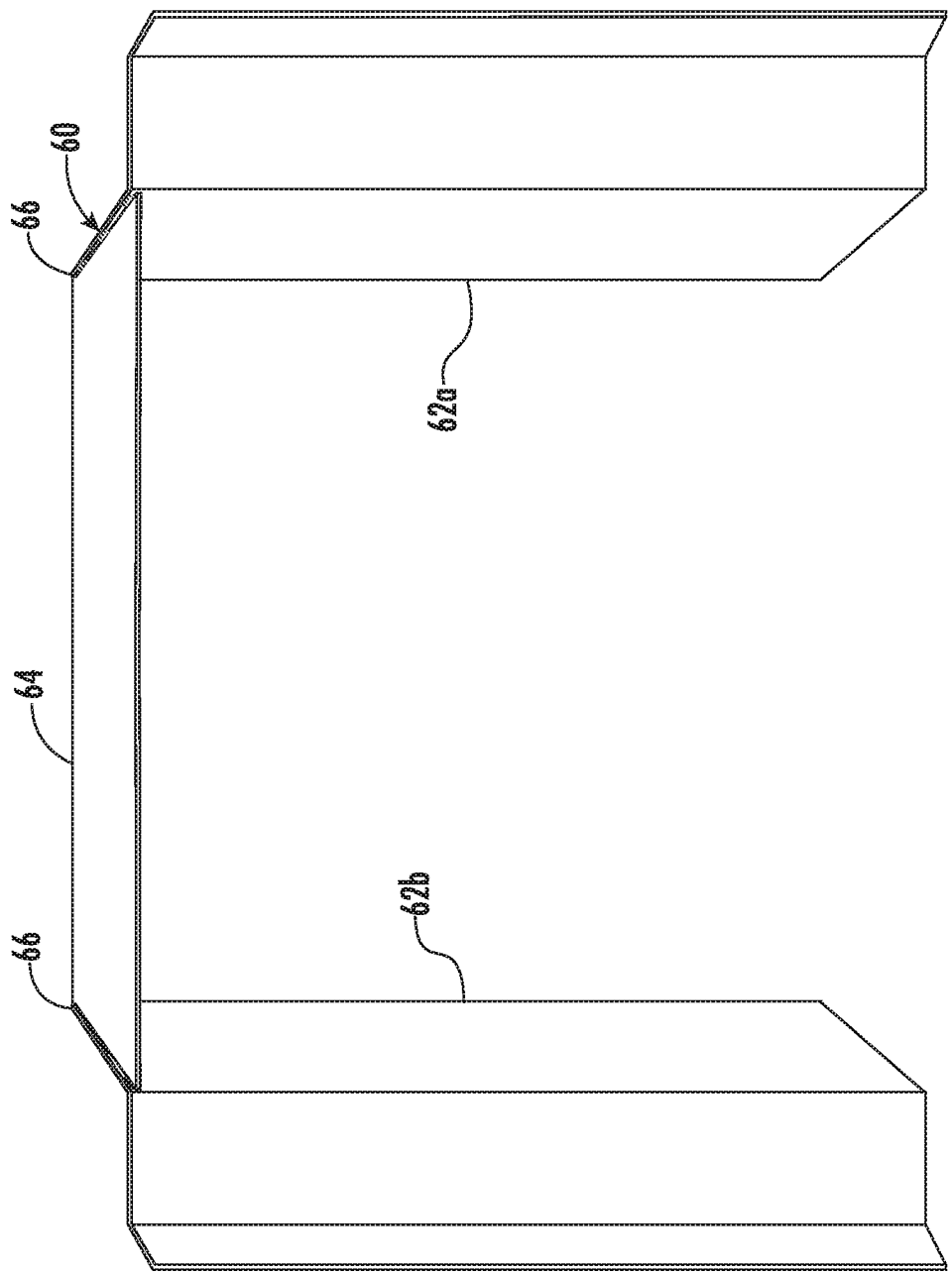
FIG. 15 is a bottom view of the assembled inner guard wall.

As shown in detail in FIG. 11, the two sides 62*a*, 62*b* and the back 64 include integral connectors 66 that allow the sides 62*a*, 62*b* to be connected to opposite edges 65*a*, 65*b* of the back 64 without tools. These integral connectors 66 include hook-shaped projections 68*a*, 68*b*, 68*c* extending from opposite edges 65*a*, 65*b* of the back and complementary slots 70 defined along at least the back edges 63*a*, 63*b* of the sides 62*a*, 62*b* that are adapted to receive the hook-shaped projections 68*a*-68*c*. As shown in FIG. 12, it is possible for the sides 62*a*, 62*b* to include the complementary slots 70 along both the front and back edges such that the two sides 62*a*, 62*b* are interchangeable. The back 64 is assembled to the two sides 62*a*, 62*b* by inserting the hook-shaped projections 68*a*-68*c* into the complementary slots 70 on the respective sides 62*a*, 62*b* and pressing downwardly on the back 64 such that the hooks of the hook-shaped projections 68a-68c engage behind the edges of the slot 70.

As best shown in FIGS. 10 and 12, the sides 62a, 62b of the inner guard wall 60 are Z-shaped in cross-section. Here, bottom legs 72 are provided that are spaced further apart from one another in the assembled state shown in FIGS. 12-15 than the top legs 74 of the two sides 62a, 62b, spaced apart by the connector portions 76. A distance between the bottom legs 72 is greater than the length L of the removable pan 50. This allows the inner guard wall 60 to be installed through the bottom of the assembled frame assembly 30 and cloth enclosure 12 and the frame assembly 30 and cloth enclosure 12 can then be stood upright and the removable pan 50 installed, as shown in detail in FIGS. 1 and 2. The pan then can be easily slid out through the pan opening 22 at the front of the Pet Privy System 10 and is guided between the bottom legs 72 of the sidewalls 62a, 62b of the inner guard wall 60.

In use, a puppy pad, cat litter, or other media for use by a pet is placed into the removable pan 50 once the Pet Privy System is assembled. The pet can then use the Pet Privy System in privacy and any mess is contained and hidden within the cloth enclosure 12, which can be decorative, and is protected from most contamination by the inner guard wall 60. The Pet Privy System provides for reduced stress and easier bathroom usage for the pet as well as easier clean up and maintenance by the owner.

Having thus described in detail a preferred selection of embodiments of the present invention, it is to be appreciated and will be apparent to those skilled in the art that many physical changes could be made in the pet privy system without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A pet privy system, comprising:
a cloth enclosure that includes sidewalls and a top;
a frame assembly that supports the cloth enclosure, the frame assembly including a top frame, first and second side frames connected to the top frame, and cross-members that are connected between opposite sides of the first and second side frames from the top frame;
one of the sidewalls of the cloth enclosure having a bottom edge that is spaced upwardly from a bottom of one of the first or second side frames or one of the cross-members by a first height to define a pan opening;
a removable protective bottom part that comprises a removable pan, having a length and a width, the length being less than a distance between the first and second side frames, and being slideable between the first and second side frames, the width being less than a distance between the cross-members, and the removable pan having a height that is less than the first height such that the removable pan is removable through the pan opening or by lifting the frame assembly and cloth enclosure such that the cross-members and the bottoms of the first and second side frames pass by the removable pan; and
wherein the top frame comprises four edge members that are connected together, the first and second side frames are pivotally connected to opposite ones of the edge members, two of the cross-members are provided and are pivotally attached to one of the first and second side frames and are engageable to the other of the first and second side frames.

2. The pet privy system of claim 1, wherein the cloth enclosure includes an opening in one of the sidewalls.

3. The pet privy system of claim 1, wherein the frame assembly further comprises two center members that extend between opposite ones of the edge members to support the top of the cloth enclosure.

4. The pet privy system of claim 1, wherein the first and second side frames are U-shaped.

5. The pet privy system of claim 1, wherein the cross-members are engageable to the other of the first and second side frames via bent ends of the cross-members engaging in receptacles fastened to the other of the first and second side frames.

6. The pet privy system of claim 1, wherein the frame assembly with the attached cloth enclosure is unfoldable from a collapsed position in which the cross-members and the first and second side frames are lying on and generally parallel to the top frame, to an assembled position in which the first and second side frames are generally perpendicular to the top frame, and the cross-members are connected between the first and second side frames to define a plane generally parallel to the top frame.

7. The pet privy system of claim 1, further comprising an inner guard wall consisting of two sides and a back that are connected together and located inside the frame assembly and are adapted to be located between the sidewalls of the cloth enclosure and the removable pan, and are arranged such that the removable pan is slidable through the pan opening out from between the two sides of the inner guard wall.

8. The pet privy system of claim 7, wherein the two sides and back each include integral connectors that directly connect the sides to opposite edges of the back without tools.

9. The pet privy system of claim 8, wherein the integral connectors include hook-shaped projections extending from the opposite edges of the back and complementary slots defined along at least back edges of the sides that are adapted to receive the hook-shaped projections.

10. The pet privy system of claim 7, wherein the sides of the inner guard wall are Z-shaped in cross-section, with bottom legs of the sidewalls being spaced further apart from one another than top legs of the side walls, and a distance between the bottom legs is greater than the length of the removable pan such that the bottom legs extend parallel to and outside of opposite sides of the removable pan.

11. The pet privy system of claim 10, wherein the removable pan has a lip at a top of the height of the removable pan, and a height of the bottom legs of the sides is greater than the height of the removable pan.

12. The pet privy system of claim 1, wherein the cloth enclosure includes straps for connection to the frame assembly.

13. The pet privy system of claim 12, wherein the straps include hook-and-loop textile fastening material.

14. A pet privy system, comprising:
a cloth enclosure that includes sidewalls and a top;
a frame assembly that supports the cloth enclosure, the frame assembly including a top frame, first and second side frames connected to the top frame, and cross-members that are connected between opposite sides of the first and second side frames from the top frame;
one of the sidewalls of the cloth enclosure having a bottom edge that is spaced upwardly from a bottom of one of the first or second side frames or one of the cross-members by a first height to define a pan opening;

a removable protective bottom part that comprises a removable pan, having a length and a width, the length being less than a distance between the first and second side frames, and being slideable between the first and second side frames, the width being less than a distance between the cross-members, and the removable pan having a height that is less than the first height such that the removable pan is removable through the pan opening or by lifting the frame assembly and cloth enclosure such that the cross-members and the bottoms of the first and second side frames pass by the removable pan; and wherein the top frame comprises four edge members that are connected together, the first and second side frames are pivotally connected to opposite ones of the edge members, two of the cross-members are provided as split cross-members, each including first and second split cross-member parts that are pivotally attached at pivot ends thereof to the first and second side frames and include free ends that are engageable to a corresponding free end of an opposite one of the split cross-member parts via a barrel connector.

15. The pet privy system of claim 14, wherein the pivot ends of the split cross-member parts are formed as bent ends and are engaged in hinge barrels located on the first and second side members.

16. The pet privy system of claim 15, wherein the hinge barrels are located at bottoms of the first and second side members.

17. The pet privy system of claim 14, wherein the frame assembly with the attached cloth enclosure is unfoldable from a collapsed position in which the split cross-members and the first and second side frames are lying on and generally parallel to the top frame, to an assembled position in which the first and second side frames are generally perpendicular to the top frame, and the split cross-members are connected between the first and second side frames to define a plane generally parallel to the top frame.

* * * * *